US012175931B2

(12) United States Patent
Wang et al.

(10) Patent No.: US 12,175,931 B2

(45) Date of Patent: Dec. 24, 2024

(54) PIXEL CIRCUIT, DRIVE METHOD THEREOF, DISPLAY SUBSTRATE, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Zhu Wang, Beijing (CN); Ling Shi, Beijing (CN); Yanyang Shang, Beijing (CN)

(73) Assignees: Beijing BOE Technology Development Co., Ltd., Beijing (CN); Chengdu BOE Optoelectronics Technology Co., Ltd., Sichuan (CN)

( * ) Notice: Subject to any disclaimer, the term of this patent is extended or adjusted under 35 U.S.C. 154(b) by 0 days.

(21) Appl. No.: 18/027,373

(22) PCT Filed: May 27, 2022

(86) PCT No.: PCT/CN2022/095675

§ 371 (c)(1),
(2) Date: Mar. 21, 2023

(87) PCT Pub. No.: WO2023/226013

PCT Pub. Date: Nov. 30, 2023

(65) Prior Publication Data

US 2024/0321196 A1 Sep. 26, 2024

(51) Int. Cl.
*G09G 3/3233* (2016.01)

(52) U.S. Cl.
CPC ... *G09G 3/3233* (2013.01); *G09G 2300/0842* (2013.01); *G09G 2310/061* (2013.01); *G09G 2310/08* (2013.01); *G09G 2330/021* (2013.01)

(58) Field of Classification Search
CPC ........................... G09G 3/3241; G09G 3/3233
See application file for complete search history.

(56) References Cited

U.S. PATENT DOCUMENTS

| | | | |
|---|---|---|---|
| 10,395,589 | B1 | 8/2019 | Vahid Far et al. |
| 2018/0122298 | A1 | 5/2018 | Lee et al. |

(Continued)

FOREIGN PATENT DOCUMENTS

| | | | |
|---|---|---|---|
| CN | 104282263 | A | 1/2015 |
| CN | 205541822 | U | 8/2016 |

(Continued)

*Primary Examiner* — Kevin M Nguyen

(74) *Attorney, Agent, or Firm* — Ling Wu; Stephen Yang; Ling and Yang Intellectual Property

(57) ABSTRACT

The invention relates to a pixel circuit, a driving method thereof, a display substrate and a display apparatus. The pixel circuit includes a first node control sub-circuit, a second node control sub-circuit, a light emitting control sub-circuit and a drive sub-circuit. The first node control sub-circuit is configured to supply a signal of the initial signal terminal to the first node and the fourth node under the control of the first reset signal terminal and the second scan signal terminal, and supply a signal of the second node to the first node under the control of the third scan signal terminal. The second node control sub-circuit is configured to supply a signal of the reference signal terminal to the second node and a signal of the data signal terminal to the third node under the control of the second reset signal terminal and the first scan signal terminal.

20 Claims, 18 Drawing Sheets

(56) References Cited

U.S. PATENT DOCUMENTS

| | | | | |
|---|---|---|---|---|
| 2021/0027714 | A1 | 1/2021 | Shi et al. | |
| 2021/0104196 | A1 | 4/2021 | Yuan | |
| 2021/0366386 | A1 | 11/2021 | Gao | |
| 2021/0407383 | A1 | 12/2021 | Lai et al. | |
| 2022/0101785 | A1* | 3/2022 | Chung | G09G 3/3233 |
| 2022/0108655 | A1 | 4/2022 | Yu et al. | |
| 2022/0122522 | A1 | 4/2022 | Li et al. | |
| 2022/0148508 | A1 | 5/2022 | Chi | |
| 2022/0157239 | A1 | 5/2022 | Zhang et al. | |
| 2022/0180810 | A1* | 6/2022 | Zhang | G09G 3/3241 |
| 2023/0116780 | A1 | 4/2023 | Zhang | |

FOREIGN PATENT DOCUMENTS

| | | | |
|---|---|---|---|
| CN | 106097968 | A | 11/2016 |
| CN | 108022550 | A | 5/2018 |
| CN | 108320712 | A | 7/2018 |
| CN | 109712571 | A | 5/2019 |
| CN | 110021273 | A | 7/2019 |
| CN | 111354293 | A | 6/2020 |
| CN | 111754920 | A | 10/2020 |
| CN | 112102785 | A | 12/2020 |
| CN | 112116890 | A | 12/2020 |
| CN | 112150967 | A | 12/2020 |
| CN | 113066434 | A | 7/2021 |
| CN | 113571013 | A | 10/2021 |
| CN | 113748455 | A | 12/2021 |
| CN | 113763888 | A | 12/2021 |
| CN | 114038420 | A | 2/2022 |
| EP | 3686875 | A1 | 7/2020 |

* cited by examiner

PIXEL CIRCUIT, DRIVE METHOD THEREOF, DISPLAY SUBSTRATE, AND DISPLAY APPARATUS

CROSS-REFERENCE TO RELATED APPLICATIONS

The present application is a U.S. National Phase Entry of International Application PCT/CN2022/095675 having an international filing date of May 27, 2022, and the contents disclosed in the above-mentioned application are hereby incorporated as a part of this application.

TECHNICAL FIELD

The present disclosure relates to, but is not limited to, the field of display technology, and in particular to a display circuit, a drive method thereof, a display substrate, and a display apparatus.

BACKGROUND

An Organic Light Emitting Diode (OLED for short) and a Quantum-dot Light Emitting Diode (QLED for short) are active light emitting display apparatuses and have advantages such as self-luminescence, wide viewing angle, high contrast ratio, low power consumption, very high response speed, lightness and thinness, flexibility, and low costs. With constant development of display technologies, a flexible display that uses an OLED or a QLED as a light emitting device and performs signal control by a Thin Film Transistor (TFT for short) has become a mainstream product in the field of display at present.

SUMMARY

The following is a summary of subject matter described herein in detail. The summary is not intended to limit the protection scope of claims.

In a first aspect, the present disclosure provides a pixel circuit disposed in a display substrate and is configured to drive the light emitting element to emit light, the display substrate includes a first driving mode and a second driving mode, wherein the refresh rate of the first driving mode is less than the refresh rate of the second driving mode, and the pixel circuit includes a first node control sub-circuit, a second node control sub-circuit, a light emitting control sub-circuit and a drive sub-circuit;

the first node control sub-circuit is electrically connected to a first power supply terminal, a first reset signal terminal, an initial signal terminal, a second scan signal terminal, a third scan signal terminal, a first node, a second node and a fourth node respectively, and is configured to supply a signal of the initial signal terminal to the first node and the fourth node under the control of the first reset signal terminal and the second scan signal terminal, and supply a signal of the second node to the first node under the control of the third scan signal terminal;

the second node control sub-circuit is electrically connected to a second reset signal terminal, a reference signal terminal, a first scan signal terminal, a data signal terminal, a second node and a third node respectively, and is configured to supply a signal of the reference signal terminal to the second node and the signal of the data signal terminal to the third node under the control of the second reset signal terminal and the first scan signal terminal;

the drive sub-circuit is connected to a first node, a second node, and a third node respectively, and is configured to provide a drive current to the third node under control of the first node and the second node;

the light emitting control sub-circuit is electrically connected to a light emitting signal terminal, a first power supply terminal, a second node, a third node and a fourth node, and is configured to supply a signal of the first power supply terminal to the second node and supply a signal of the third node to the fourth node under the control of the light emitting signal terminal;

the light emitting element is electrically connected to a fourth node and a second power supply terminal, respectively; and the voltage value of a signal at the reference signal terminal in the first driving mode is different from the voltage value of a signal in the second driving mode.

In some possible implementations, the first reset signal terminal and the second reset signal terminal are the same signal terminal.

In some possible implementations, the voltage value of a signal at the reference signal terminal in the first driving mode is less than the voltage value of a signal in the second driving mode;

the voltage value of a signal at the reference signal terminal is greater than or equal to the voltage value of a signal at the initial signal terminal.

In some possible implementations, when the signals of the first reset signal terminal and the second reset signal terminal are valid level signals, a signal of the second scan signal terminal is a valid level signal, and the signals of the first scan signal terminal, the third scan signal terminal and the light emitting signal terminal are invalid level signals;

when a signal of the first scan signal terminal is a valid level signal, a signal of the third scan signal terminal is an valid level signal, and the signals of the first reset signal terminal, the second reset signal terminal, the second scan signal terminal and the light emitting signal terminal are invalid level signals;

when a signal of the light emitting signal terminal is an valid level signal, the signals of the first reset signal terminal, the second reset signal terminal, the first scan signal terminal, the second scan signal terminal and the third scan signal terminal are invalid level signals.

In some possible implementations, the first node control sub-circuit includes: a reset sub-circuit, a compensation sub-circuit, and a storage sub-circuit;

the reset sub-circuit is respectively electrically connected to a first reset signal terminal, a initial signal terminal, a second scan signal terminal, a first node and a fourth node, and is configured to provide the first node and the fourth node with a signal of the initial signal terminal under the control of the first reset signal terminal and the second scan signal terminal;

the compensation sub-circuit is electrically connected to a first node, a second node, and a third scan signal terminal, and is configured to provide the first node with a signal of the second node under the control of the third scan signal terminal; and the storage sub-circuit is electrically connected to a first power supply terminal and a first node respectively, and is configured to store a voltage difference between a signal at the first power supply terminal and a signal at the first node.

In some possible implementations, the second node control sub-circuit includes: a control sub-circuit and a write sub-circuit;

the control sub-circuit is electrically connected to a second reset signal terminal, a reference signal terminal and a second node respectively, and is configured to supply a signal of the reference signal terminal to the second node under the control of the second reset signal terminal; and the write sub-circuit is electrically connected to a first scan signal terminal, a data signal terminal and a third node respectively, and is configured to supply a signal of the data signal terminal to the third node under the control of the first scan signal terminal.

In some possible implementations, the reset sub-circuit includes: a first transistor and a second transistor, the compensation sub-circuit includes: a seventh transistor, and the storage sub-circuit includes: a capacitor including: a first electrode plate and a second electrode plate;

a control electrode of the first transistor is electrically connected to a first reset signal terminal, a first electrode of the first transistor is electrically connected to a initial signal terminal, and a second electrode of the first transistor is electrically connected to a fourth node;

a control electrode of the second transistor is electrically connected to a second scan signal terminal, a first electrode of the second transistor is electrically connected to a first node, and a second electrode of the second transistor is electrically connected to a fourth node;

a control electrode of the seventh transistor is electrically connected to a third scan signal terminal, a first electrode of the seventh transistor is electrically connected to a first node, and a second electrode of the seventh transistor is electrically connected to a second node;

a first electrode plate of the capacitor is electrically connected to a first node, and a second electrode plate of the capacitor is electrically connected to a first power supply terminal.

In some possible implementations, the write sub-circuit includes: a fourth transistor, and the control sub-circuit includes: an eighth transistor;

a control electrode of the fourth transistor is electrically connected to a first scan signal terminal, a first electrode of the fourth transistor is electrically connected to a data signal terminal, and a second electrode of the fourth transistor is electrically connected to a third node; and a control electrode of the eighth transistor is electrically connected to a third scan signal terminal, a first electrode of the eighth transistor is electrically connected to a reference signal terminal, and a second electrode of the eighth transistor is electrically connected to a second node.

In some possible implementations, the first node control sub-circuit includes: a first transistor, a second transistor, a seventh transistor, and a capacitor, the capacitor includes: a first electrode plate and a second electrode plate; the second node control sub-circuit includes a fourth transistor and an eighth transistor; the drive sub-circuit includes a third transistor, and the light emitting control sub-circuit includes a fifth transistor and a sixth transistor;

a control electrode of the first transistor is electrically connected to a first reset signal terminal, a first electrode of the first transistor is electrically connected to a initial signal terminal, and a second electrode of the first transistor is electrically connected to a fourth node;

a control electrode of the second transistor is electrically connected to a second scan signal terminal, a first electrode of the second transistor is electrically connected to a first node, and a second electrode of the second transistor is electrically connected to a fourth node;

a control electrode of the third transistor is electrically connected to a first node, a first electrode of the third transistor is electrically connected to a second node, and a second electrode of the third transistor is electrically connected to a third node;

a control electrode of the fourth transistor is electrically connected to a first scan signal terminal, a first electrode of the fourth transistor is electrically connected to a data signal terminal, and a second electrode of the fourth transistor is electrically connected to a third node; and a control electrode of the fifth transistor is electrically connected to a light emitting signal terminal, a first electrode of the fifth transistor is electrically connected to a first power supply terminal, and a second electrode of the fifth transistor is electrically connected to a second node;

a control electrode of the sixth transistor is electrically connected to a light emitting signal terminal, a first electrode of the sixth transistor is electrically connected to a third node, and a second electrode of the sixth transistor is electrically connected to a fourth node;

a control electrode of the seventh transistor is electrically connected to a third scan signal terminal, a first electrode of the seventh transistor is electrically connected to a first node, and a second electrode of the seventh transistor is electrically connected to a second node;

a control electrode of the eighth transistor is electrically connected to a third scan signal terminal, a first electrode of the eighth transistor is electrically connected to a reference signal terminal, and a second electrode of the eighth transistor is electrically connected to a second node;

a first electrode plate of the capacitor is electrically connected to a first node, and a second electrode plate of the capacitor is electrically connected to a first power supply terminal.

In some possible implementations, the transistor types of a first transistor, a third to a sixth transistors, and an eighth transistor are opposite to the transistor types of a second transistor and a seventh transistor; and the second transistor and the seventh transistor are oxide transistors.

In a second aspect, the present disclosure provides a display substrate, including: a base substrate, and a circuit structure layer and a light emitting structure layer sequentially disposed on the base substrate, the light emitting structure layer includes a light emitting element, and the circuit structure layer includes an aforementioned pixel circuit arranged in an array.

In some possible implementations, the circuit structure layer further includes: multiple first reset signal lines, multiple second reset signal lines, multiple first scan signal lines, multiple second scan signal lines, multiple third scan signal lines, multiple light emitting signal lines, multiple initial signal lines, and multiple reference signal lines extending along a first direction and arranged along a second direction and multiple first power supply lines and multiple data signal lines extending along the second direction and arranged along the first direction, where the first direction intersects the second direction;

a first reset signal line of the pixel circuit is electrically connected to a first reset signal line, a second reset signal terminal is electrically connected to a second reset signal line, a first scan signal terminal is electrically connected to a first scan signal line, a second scan signal terminal is electrically connected to a second scan signal line, a third scan signal terminal is electrically connected to a third scan signal line, a light emitting signal terminal is electrically connected to a light emitting signal line, an initial signal terminal is electrically connected to a initial signal line, a reference signal terminal is electrically connected to a reference signal line, a first power supply terminal is electrically connected to the first power supply line, and a data signal terminal is electrically connected to a data signal line.

In some possible implementations, pixel structures of adjacent pixel circuits located in the same row are symmetrical with respect to a dummy straight line extending in a second direction;

an adjacent pixel circuit located in the same row as the pixel circuit includes a first adjacent pixel circuit and a second adjacent pixel circuit.

In some possible implementations, the pixel circuit includes: a first transistor to an eighth transistor, and the gate electrodes of the second transistor and the seventh transistor each include: a first gate electrode and a second gate electrode;

the second scan signal line includes a first sub-scan signal line and a second sub-scan signal line which are arranged in different layers and connected to each other, a first gate electrode of the second transistor is arranged in the same layer as the first sub-scan signal line, and a second gate electrode of the second transistor is arranged in the same layer as the second sub-scan signal line;

the third scan signal line includes a third sub-scan signal line and a fourth sub-scan signal line which are arranged in different layers and connected to each other, a first gate electrode of the seventh transistor is arranged in the same layer as the third sub-scan signal line, and a second gate electrode of the seventh transistor is arranged in the same layer as the fourth sub-scan signal line.

In some possible implementations, the pixel circuit further includes: a capacitor, and the capacitor includes: a first electrode plate and a second electrode plate, the circuit structure layer includes: a first semiconductor layer, a first insulation layer, a first conductive layer, a second insulation layer, a second conductive layer, a third insulation layer, a second semiconductor layer, a fourth insulation layer, a third conductive layer, a fourth conductive layer, a first planarization layer and the s fifth conductive layer which are sequentially stacked on the base substrate;

the first semiconductor layer includes: an active layer of a first transistor, an active layer of a third transistor to an active layer of a sixth transistor and an active layer of an eighth transistor in at least one pixel circuit;

the first conductive layer includes: a first reset signal line, a second reset signal line, a first scan signal line, a light emitting signal line, and a first electrode plate, a gate electrode of a first transistor, a gate electrode of a third transistor, a gate electrode of a fourth transistor, a gate electrode of a fifth transistor, a gate electrode of a sixth transistor, and a gate electrode of an eighth transistor disposed on a capacitor of at least one pixel circuit;

the second conductive layer includes: a first sub-scan signal line, a third sub-scan signal line, a second electrode plate of a capacitor located in at least one pixel circuit, a first gate electrode of a second transistor and a first gate electrode of a seventh transistor;

the second semiconductor layer includes: an active layer of a second transistor and an active layer of a seventh transistor located in at least one pixel circuit;

the third conductive layer includes: a reference signal line, a second sub-scan signal line, a fourth sub-scan signal line, and a second gate electrode of a second transistor and a second gate electrode of a seventh transistor located in at least one pixel circuit;

the fourth conductive layer includes: an initial signal line and a first and second electrodes of a first transistor, a first and second electrodes of a second transistor, a first electrode of a fourth transistor, a first electrode of a fifth transistor, a second electrode of a sixth transistor, a first and second electrodes of a seventh transistor and a first and second electrodes of the eighth transistor located in at least one pixel circuit;

the fifth conductive layer includes: a first power supply line, a data signal line and a connection electrode located in at least one pixel circuit, and the light emitting element is connected to the connection circuit.

In some possible implementations, a second reset signal line and a first scan signal line connected to the pixel circuit are located on the same side of a first electrode plate of a capacitor of the pixel circuit, and the second reset signal line is located on a side of the first scan signal line away from the first electrode plate of the capacitor of the pixel circuit;

a light emitting signal line and a first reset signal line connected to the pixel circuit are located on a side of the first electrode plate of the pixel circuit away from the first scan signal line, and the first reset signal line is located on a side of the light emitting signal line away from the first electrode plate of the capacitor of the pixel circuit;

a first scan signal line includes a scan main body portion and a scan connection portion, wherein a terminal of the scan connection portion is connected to the scan main body portion;

the scan main body portion extends along a first direction, and the scan connection portion is L-shaped.

In some possible implementations, a first reset signal line includes: multiple first reset connection portions and multiple second reset connection portions arranged at intervals, a second reset connection portion is arranged between two adjacent first reset connection portions and is connected to the adjacent two first reset connection portions; a second reset signal line includes multiple third reset connection portions and multiple fourth reset connection portions arranged at intervals, wherein a fourth reset connection portion is arranged between two adjacent third reset connection portions and is connected to the adjacent third reset connection portions;

a first reset connection portion and a third reset connection portion extend in a first direction, a second reset connection portion is provided with an opening whose opening direction faces the light emitting signal line, a fourth reset connection portion is provided with an opening whose opening deviates from the first scan signal line, and a dummy straight line extending in a second direction passes through a second reset connection portion of a first reset signal line and a fourth reset connection portion of a second reset signal line;

a gate electrode of a first transistor and a first reset connection portion of a first reset signal line are integrally formed, and a gate electrode of an eighth transistor and a fourth reset connection portion of a second reset signal line are integrally formed.

In some possible implementations, second electrode plates of capacitors of adjacent pixel circuits located in the same row are connected;

a first sub-scan signal line of a second scan signal line and a third sub-scan signal line of a third scan signal line connected to the pixel circuit are respectively arranged on opposite sides of a second electrode plate of a capacitor of a pixel circuit;

a first sub-scan signal line and a first gate electrode of a second transistor are integrally formed, and a third sub-scan signal line and a first gate electrode of a seventh transistor are integrally formed;

an orthographic projection of a first sub-scan signal line on a base substrate is located between an orthographic projection of a light emitting signal line on the base substrate and an orthographic projection of a first reset signal line on the base substrate;

an orthographic projection of a third sub-scan signal line on the base substrate overlaps an orthographic projection of a scan connection portion of a first scan signal line on the base substrate, and the orthographic projection on the base substrate is located between an orthographic projection of a scan main body portion of a first scan signal line on the base substrate and an orthographic projection of a second electrode plate of a capacitor of the connected pixel circuit on the base substrate.

In some possible implementations, a second sub-scan signal line and a second gate electrode of a second transistor are integrally formed, and a fourth sub-scan signal line and a second gate electrode of a seventh transistor are integrally formed;

an orthographic projection of a second sub-scan signal line on the base substrate at least partially overlaps an orthographic projection of a first sub-scan signal line on the base substrate.

An orthographic projection of a fourth sub-scan signal line on the base substrate at least partially overlaps with an orthographic projection of a third sub-scan signal line on the base substrate;

an orthographic projection of a reference signal line on the base substrate partially overlaps with an orthographic projection of a second reset signal line on the base substrate.

In some possible implementations, a fifth insulation layer includes: patterns of multiple via holes, the patterns of the multiple via holes include: a first via hole to a sixth via hole provided on a first insulation layer to a fifth insulation layer, a seventh via hole provided on a second to fifth insulation layers, an eighth via hole provided on a third to fifth insulation layers, a ninth via hole and a tenth via hole provided on a fourth and fifth insulation layers, and an eleventh via hole provided on the fifth insulation layer, wherein the eighth via hole exposes a second electrode plate of a capacitor, and an eleventh via hole exposes a reference signal line;

a dummy straight line extending in a second direction passes through an eighth via hole and an eleventh via hole;

an eighth via hole of the pixel circuit is the same via hole as an eighth via hole of the first adjacent pixel circuit, and an eleventh via hole of the pixel circuit is the same via hole as an eleventh via hole of the first adjacent pixel circuit.

In some possible implementations, a first electrode of a fifth transistor of the pixel circuit is the same electrode as a first electrode of a fifth transistor of the first adjacent pixel circuit, and a first electrode of an eighth transistor of the pixel circuit is the same electrode as a first electrode of an eighth transistor of the first adjacent pixel circuit;

an orthographic projection of an initial signal line on the base substrate partially overlaps with an orthographic projection of a second reset connection portion of a first reset signal line on the base substrate;

a second electrode of a first transistor, a second electrode of a second transistor and a second electrode of a sixth transistor are integrally formed, and an orthographic projections on the base substrate partially overlap with the orthographic projections of a second scan signal line and a light emitting signal line on the base substrate;

an orthographic projection of a first electrode of a fifth transistor on the base substrate partially overlaps with an orthographic projection of s light emitting signal line connected to s second electrode plate of a capacitor and the pixel circuit on the base substrate, and the first electrode of the fifth transistor includes an opening facing a second scan signal line connected to the pixel circuit;

a first electrode of a second transistor and a first electrode of a seventh transistor are integrally formed, and the orthographic projections on the base substrate partially overlap with an orthographic projection of a light emitting signal line connected to a second electrode plate of a capacitor and the pixel circuit on the base substrate;

a second electrode of a seventh transistor and a second electrode of a eighth transistor are integrally formed, and the orthographic projections on the base substrate partially overlap with the orthographic projections of a first scan signal line connected to the pixel circuit and a third scan signal line connected to the pixel circuit on the base substrate;

an orthographic projection of a first electrode of an eighth transistor on the base substrate partially overlaps with an orthographic projection of a reference signal line connected to the pixel circuit on the base substrate.

In some possible implementations, a first power supply line connected to the pixel circuit is the same power supply line as a first power supply line connected to the first adjacent pixel circuit;

a data signal line and a first power supply line connected to the pixel circuit are respectively located on two sides of a connection electrode, and a length of the first power supply line along a first direction is greater than a length of the data signal line along the first direction.

In some possible implementations, a first power supply line connected to the pixel circuit may include: a first power supply portion, a second power supply portion and a third power supply portion arranged in sequence along a second direction, wherein the second power supply portion is connected to the first power supply portion and the third power supply portion, respectively;

a length of the third power supply portion along a first direction is greater than a length of the first power supply portion along the first direction, and a length of the first power supply portion along the first direction is greater than a length of the second power supply portion along the first direction;

a connection electrode of the pixel circuit is located on a side of the second power supply portion of the pixel circuit close to the data signal line connected to the pixel circuit.

In some possible implementations, an orthographic projection of a first power supply line on the base substrate partially overlaps with the orthographic projections of an integrated structure of a first electrode of a fifth transistor, a first electrode of a first transistor, a first electrode of a second transistor, and a first electrode of a seventh transistor and an integrated structure of a second electrode of a seventh transistor and a second electrode of an eighth transistor on the base substrate.

In a third aspect, the present disclosure further provides a display apparatus, including the display substrate described above.

In a fourth aspect, the present disclosure further provides a drive method for a pixel circuit, configured to drive the pixel circuit described above. The method includes the following operations.

A first node control sub-circuit supplies a signal of an initial signal terminal to a first node and a fourth node under the control of a first reset signal terminal and a second scan signal terminal, and a second node control sub-circuit supplies a signal of a reference signal terminal to a second node under the control of a second reset signal terminal and a first scan signal terminal;

- a first node control sub-circuit supplies a signal of a second node to a first node under the control of a third scan signal terminal, and a second node control sub-circuit supplies a signal of a data signal terminal to a third node under the control of a second reset signal terminal and a first scan signal terminal;
- a drive sub-circuit supplies a drive current to a third node under the control of a first node and a second node, and a light emitting control sub-circuit supplies a signal of a first power supply terminal to a second node and a signal of a third node to a fourth node under the control of a light emitting signal terminal.

Other aspects may be understood upon reading and understanding the drawings and the detailed description.

BRIEF DESCRIPTION OF DRAWINGS

The accompanying drawings are used for providing understanding of technical solutions of the present disclosure, and form a part of the specification. They are used for explaining the technical solutions of the present disclosure together with the embodiments of the present disclosure, but do not form a limitation on the technical solutions of the present disclosure.

DETAILED DESCRIPTION

Figure 1:
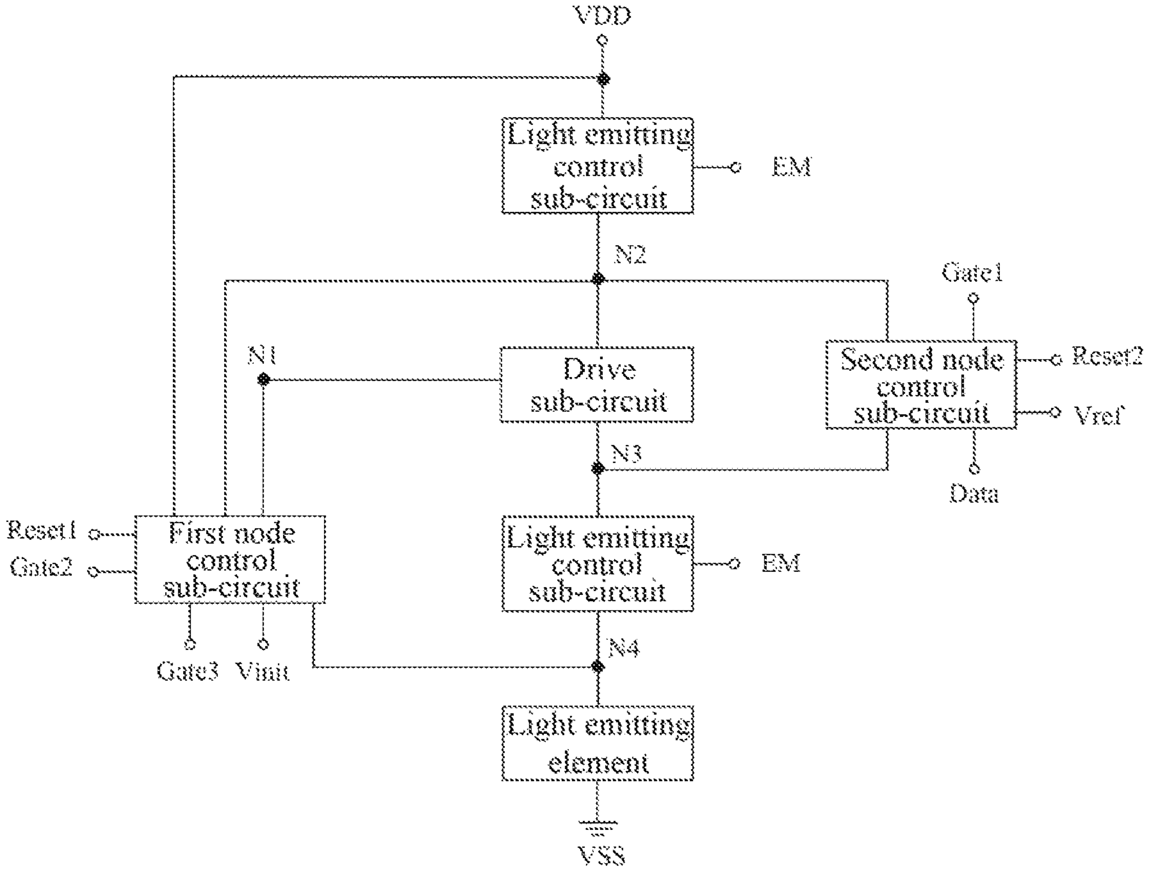
FIG. 1 is a schematic diagram of a structure of a pixel circuit in a display substrate according to an embodiment of the present disclosure.

To make objectives, technical solutions, and advantages of the present disclosure clearer, the embodiments of the present disclosure will be described in detail with reference to the accompanying drawings. It is to be noted that implementation modes may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

In the drawings, a size of each constituent element, a thickness of a layer, or a region is exaggerated sometimes for clarity. Therefore, one implementation mode of the present disclosure is not necessarily limited to the sizes, and shapes and sizes of various components in the drawings do not reflect actual scales. In addition, the drawings schematically illustrate ideal examples, and one implementation of the present disclosure is not limited to the shapes, numerical values, or the like shown in the drawings.

Ordinal numerals such as "first", "second", and "third" in the specification are set to avoid confusion of constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. It may be a mechanical connection or an electrical connection. It may be a direct mutual connection, or an indirect connection through middleware, or internal communication between two components. Those of ordinary skill in the art may understand specific meanings of these terms in the present disclosure according to specific situations.

In the specification, a transistor refers to a component which includes at least three terminals, i.e., a gate electrode, a drain electrode and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be the source electrode, and the second electrode may be the drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the specification.

In the specification, "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switch elements such as transistors, resistors, inductors, capacitors, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulation film" may be replaced with an "insulation layer" sometimes.

In the present disclosure, "about" refers to that a boundary is defined not so strictly and numerical values within process and measurement error ranges are allowed.

The display apparatus includes a pixel circuit for driving a light emitting element to emit light. The display apparatus has two driving modes, a first driving mode and a second driving mode, and the refresh rate (also called display frequency) of the first driving mode is lower than the refresh rate of the second driving mode. The first driving mode may be referred to as a low frequency driving mode and the second driving mode may be referred to as a high frequency driving mode. The pixel circuit cannot simultaneously meet the driving requirements of the first driving mode and the second driving mode, and cannot dynamically control the gate voltage of the drive transistor when different driving modes are switched, thereby reduce the reliability of the display apparatus.

FIG. 1 is a schematic diagram of a structure of a pixel circuit in a display substrate according to an embodiment of the present disclosure. As shown in FIG. 1, a pixel circuit according to an embodiment of the present disclosure is disposed in a display substrate and is configured to drive the light emitting element to emit light, the display substrate includes a first driving mode and a second driving mode, wherein the refresh rate of the first driving mode is less than the refresh rate of the second driving mode, and the pixel circuit includes a first node control sub-circuit, a second node control sub-circuit, a light emitting control sub-circuit and a drive sub-circuit.

In the present disclosure, the first node control sub-circuit is electrically connected to a first power supply terminal VDD, a first reset signal terminal Reset1, an initial signal terminal Vinit, a second scan signal terminal Gate2, a third scan signal terminal Gate3, a first node N1, a second node N2 and a fourth node N4 respectively, and is configured to supply a signal of the initial signal terminal Vinit to the first node N1 and the fourth node N4 under the control of the first reset signal terminal Reset1 and the second scan signal terminal Gate2, and supply a signal of the second node N2 to the first node N1 under the control of the third scan signal terminal Gate3. The second node N2 control sub-circuit is electrically connected to a second reset signal terminal Reset2, a reference signal terminal Vref, a first scan signal terminal Gate1, a data signal terminal Data, a second node N2 and a third node N3 respectively, and is configured to supply a signal of the reference signal terminal Vref to the second node N2 and the signal of the data signal terminal Data to the third node N3 under the control of the second reset signal terminal Reset2 and the first scan signal terminal Gate1. The drive sub-circuit is electrically connected with a first node N1, a second node N2 and a third node N3 respectively, and is configured to provide a drive current to the third node N3 under control of the first node N1 and the second node N2. The light emitting control sub-circuit is electrically connected to a light emitting signal terminal EM, a first power supply terminal VDD, a second node N2, a third node N3 and a fourth node N4, and is configured to supply a signal of the first power supply terminal VDD to the second node N2 and supply a signal of the third node N3 to the fourth node N4 under the control of the light emitting signal terminal EM.

In the present disclosure, a voltage value of a signal of the reference signal terminal Vref in the first driving mode is different from a voltage value of a signal in the second driving mode.

In an exemplary embodiment, the refresh rate of the first driving mode may be 1 HZ-60 HZ, and the refresh rate of the second driving mode may be 60 HZ-480 HZ. As an example, the refresh rate of the first driving mode may be 1 Hz, and the refresh rate of the second driving mode may be 120 Hz. The contents displayed on the display substrate include multiple display frames. In the first driving mode, the display frames include a refresh frame and at least one hold frame. In the second driving mode, the display frame only includes: a refresh frame.

In an exemplary embodiment, the first power supply terminal VDD continuously provides a high-level signal, and the second power supply terminal VSS continuously provides a low-level signal.

In an exemplary embodiment, the light emitting element is electrically connected to a fourth node N4 and a second power supply terminal VSS, respectively.

In an exemplary embodiment, the light emitting element may be an Organic light emitting Diode (OLED), including a first electrode (anode), an organic light emitting layer, and a second electrode (cathode) that are stacked. For instance, the anode of the OLED is electrically connected to the fourth node N4, and the cathode of the OLED is electrically connected to the second power supply terminal VSS.

In an exemplary embodiment, the organic emitting layer may include a Hole Injection Layer (HIL for short), a Hole Transport Layer (HTL for short), an Electron Block Layer (EBL for short), an Emitting Layer (EML for short), a Hole Block Layer (HBL for short), an Electron Transport Layer (ETL for short), and an Electron Injection Layer (EIL for short) that are stacked. In an exemplary implementation mode, hole injection layers of all sub-pixels may be a common layer connected together, electron injection layers of all the sub-pixels may be a common layer connected together, hole transport layers of all the sub-pixels may be a common layer connected together, electron transport layers of all the sub-pixels may be a common layer connected together, hole block layers of all the sub-pixels may be a common layer connected together, emitting layers of adjacent sub-pixels may be overlapped slightly or may be isolated from each other, and electron block layers of adjacent sub-pixels may be overlapped slightly or may be isolated from each other.

An embodiment of the present disclosure provides a pixel circuit which is configured to drive a light emitting element to emit light. The pixel circuit includes a first node control sub-circuit, a second node control sub-circuit, a light emitting control sub-circuit and a drive sub-circuit. The first node control sub-circuit is electrically connected to a first power supply terminal, a first reset signal terminal, an initial signal terminal, a second scan signal terminal, a third scan signal terminal, a first node, a second node and a fourth node respectively, and is configured to supply a signal of the initial signal terminal to the first node and the fourth node under the control of the first reset signal terminal and the second scan signal terminal, and supply a signal of the second node to the first node under the control of the third scan signal terminal. The second node control sub-circuit is electrically connected to a second reset signal terminal, a reference signal terminal, a first scan signal terminal, a data signal terminal, a second node and a third node respectively, and is configured to supply a signal of the reference signal terminal to the second node and the signal of the data signal terminal to the third node under the control of the second reset signal terminal and the first scan signal terminal. The drive sub-circuit is connected to a first node, a second node, and a third node respectively, and is configured to provide a drive current to the third node under control of the first node and the second node. The light emitting control sub-circuit is electrically connected to a light emitting signal terminal, a first power supply terminal, a second node, a third node and a fourth node, and is configured to supply a signal of the first power supply terminal to the second node and supply a signal of the third node to the fourth node under the control of the light emitting signal terminal. The light emitting element is electrically connected to a fourth node and a second power supply terminal, respectively. The voltage value of a signal at the reference signal terminal in the first driving mode is different from the voltage value of a signal in the second driving mode. The present disclosure can stabilize the voltages of the first node, the second node and the fourth node through the arrangement of the first node control sub-circuit and the second node control sub-circuit. And different signals are provided to the second node in different driving modes, the signal of the second node can be dynamically adjusted, so that the pixel circuit can simultaneously meet the driving requirements of the first driving mode and the second driving mode, and the gate voltage of the drive transistor can be dynamically controlled when different driving modes are switched, thus improving the reliability of the display apparatus.

In an exemplary embodiment, the first reset signal terminal Reset1 and the second reset signal terminal Reset2 may be the same signal terminal. As an example, the first reset signal terminal Reset1 and the second reset signal terminal Reset2 may be connected to the same signal line or to two different signal lines having the same signal, and the present disclosure is not limited thereto.

In an exemplary embodiment, when the signals of the first reset signal terminal Reset1 and the second reset signal terminal Reset2 are valid level signals, the signal of the second scan signal terminal Gate2 is an valid level signal, and the signals of the first scan signal terminal Gate1, the third scan signal terminal Gate3 and the light emitting signal terminal EM are invalid level signals.

In an exemplary embodiment, when the signal of the first scan signal terminal Gate1 is an valid level signal, the signal of the third scan signal terminal Gate3 is an valid level signal, and the signals of the first reset signal terminal Reset1, the second reset signal terminal Reset2, the second scan signal terminal Gate2 and the light emitting signal terminal EM are invalid level signals;

In an exemplary embodiment, when the signal of the light emitting signal terminal EM is an valid level signal, the signals of the first reset signal terminal Reset1, the second reset signal terminal Reset2, the first scan signal terminal Gate1, the second scan signal terminal Gate2, and the third scan signal terminal Gate3 are invalid level signals.

In an exemplary embodiment, the voltage value of the signal, when the signal of the reference signal terminal Vref is an valid level signal, is greater than the voltage value of the signal when the signal of the initial signal terminal Vinit is an valid level signal. In the present invention, the voltage value of the signal when the signal of the reference signal terminal Vref is an valid level signal is greater than the voltage value of the signal when the signal of the initial signal terminal Vinit is an valid level signal, so that the second node N2 can be charged when the signal of the third scan signal terminal is an valid level, and the charging efficiency of the first node N1 can be improved.

In an exemplary embodiment, the voltage value of the signal of the reference signal terminal Vref in the first driving mode may be less than the voltage value of the signal of the reference signal terminal Vref in the second driving mode.

In an exemplary embodiment, in the first driving mode, the signal of the reference signal terminal Vref may be the same as the signal of the initial signal terminal Vinit, or it may be greater than the signal of the initial signal terminal Vinit, and the present disclosure is not limited therein.

In an exemplary embodiment, the voltage value of the signal when the signal of the initial signal terminal Vinit is an valid level signal in the first driving mode may be equal to the voltage value of the signal when the signal of the initial signal terminal Vinit is an valid level signal in the second driving mode.

Figure 2:
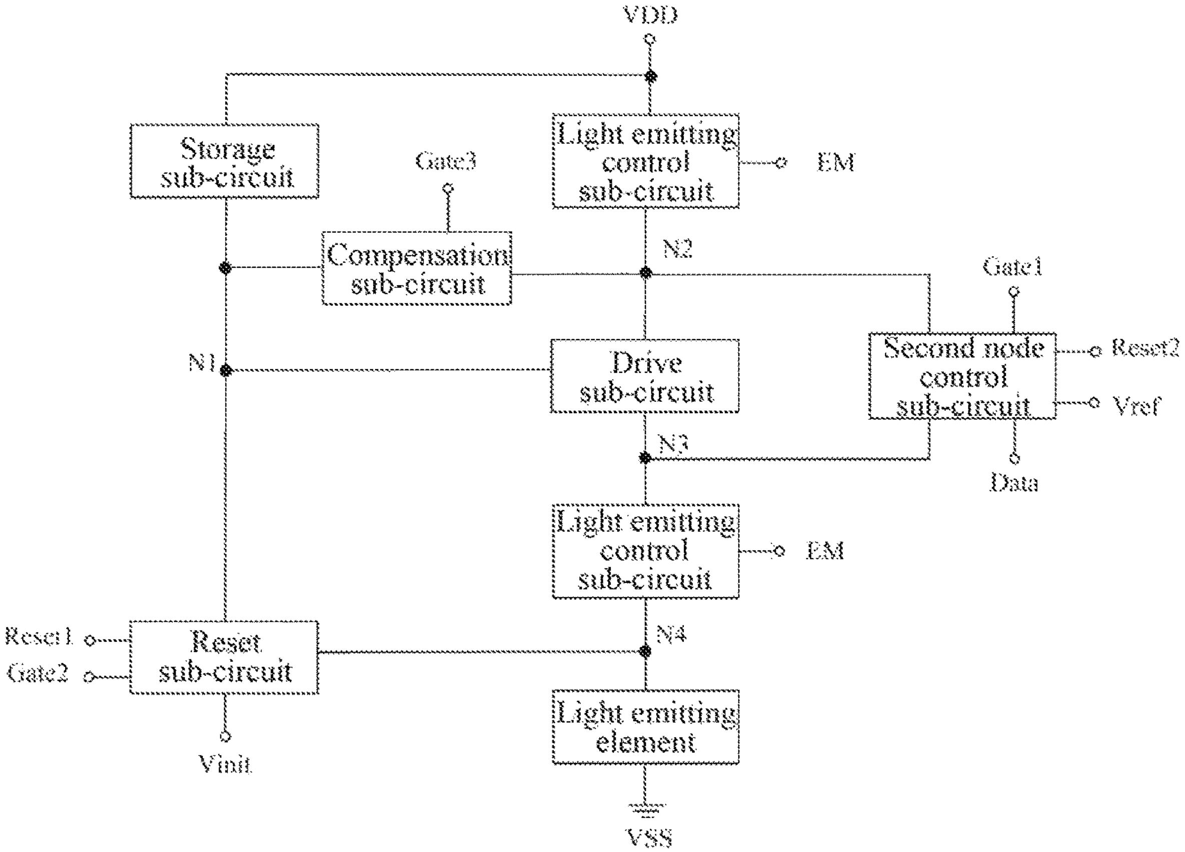
FIG. 2 is an schematic diagram of a structure of a first node control sub-circuit according to an exemplary embodiment.

In an exemplary embodiment, FIG. 2 is an schematic diagram of a structure of a first node control sub-circuit according to an exemplary embodiment. As shown in FIG. 2, in an exemplary embodiment, the first node control sub-circuit may include: a reset sub-circuit, a compensation sub-circuit, and a storage sub-circuit;

As shown in FIG. 2, the reset sub-circuit is electrically connected to the first reset signal terminal Reset1, the initial signal terminal Vinit, the second scan signal terminal Gate2, the first node N1 and the fourth node N4, respectively, and is configured to supply a signal of the initial signal terminal Vinit to the first node N1 and the fourth node N4 under the control of the first reset signal terminal Reset1 and the second scan signal terminal Gate2. The compensation sub-circuit is electrically connected to the first node N1, the second node N2 and the third scan signal terminal Gate3, respectively, and is configured to provide a signal of the second node N2 to the first node N1 under the control of the third scan signal terminal Gate3. The storage sub-circuit is electrically connected to the first power supply terminal VDD and the first node N1, respectively, and is configured to store a voltage difference between the signal of the first power supply terminal VDD and the signal of the first node N1.

Figure 3:
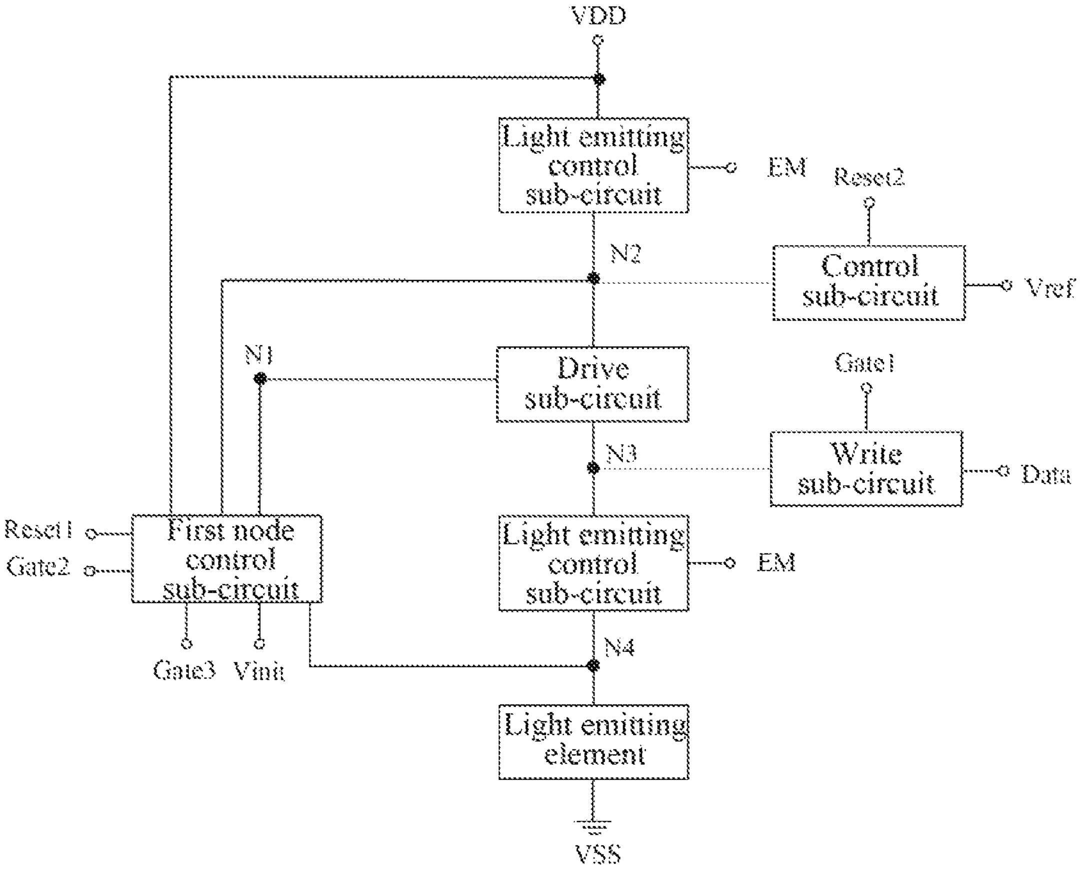
FIG. 3 is an schematic diagram of a structure of a second node control sub-circuit according to an exemplary embodiment.

In an exemplary embodiment, FIG. 3 is an schematic diagram of a structure of a second node control sub-circuit according to an exemplary embodiment. As shown in FIG. 3, in an exemplary embodiment, the second node control sub-circuit may include: a control sub-circuit and a write sub-circuit.

As shown in FIG. 3, a control sub-circuit is electrically connected to a second reset signal terminal Reset2, a reference signal terminal Vref and a second node N2, respectively, and is configured to supply a signal of the reference signal terminal Vref to the second node N2 under the control of the second reset signal terminal Reset2. The write sub-circuit is electrically connected to a first scan signal terminal Gate1, a data signal terminal Data and a third node N3, respectively, and is configured to supply a signal of the data signal terminal Data to the third node N3 under the control of the first scan signal terminal Gate1.

Figure 4:
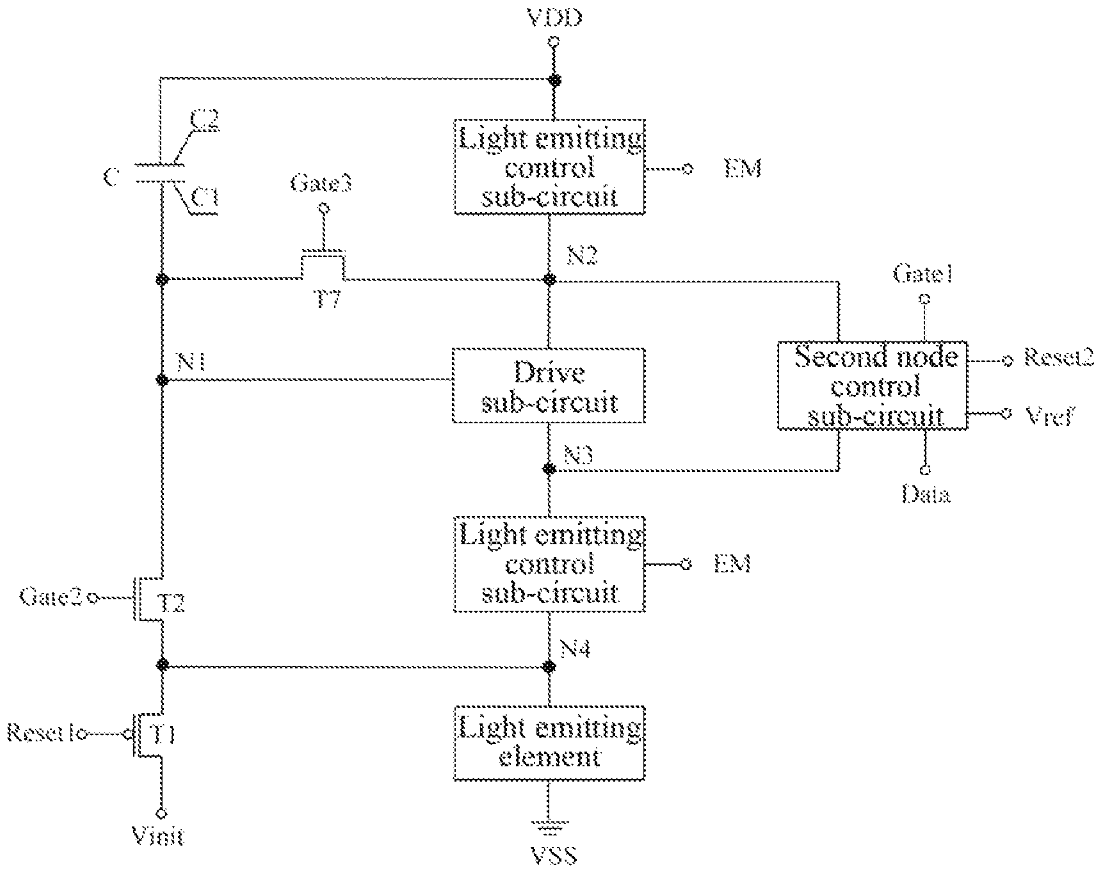
FIG. 4 is an equivalent circuit diagram of a first node control sub-circuit according to an exemplary embodiment.

FIG. 4 is an equivalent circuit diagram of a first node control sub-circuit according to an exemplary embodiment. As shown in FIG. 4, in an exemplary embodiment, the reset sub-circuit may include: a first transistor T1 and a second transistor T2, the compensation sub-circuit may include: a seventh transistor T7, and the storage sub-circuit may include: a capacitor C including: a first electrode plate C1 and a second electrode plate C2.

As shown in FIG. 4, a control electrode of the first transistor T1 is electrically connected to a first reset signal terminal Reset1, a first electrode of the first transistor T1 is electrically connected to an initial signal terminal Vinit, and a second electrode of the first transistor T1 is electrically connected to a fourth node N4. A control electrode of the second transistor T2 is electrically connected to a second scan signal terminal Gate2, a first electrode of the second transistor T2 is electrically connected to a first node N1, and a second electrode of the second transistor T2 is electrically connected to the fourth node N4. A control electrode of the seventh transistor T7 is electrically connected to a third scan signal terminal Gate3, a first electrode of the seventh transistor T7 is electrically connected to a first node N1, and a second electrode of the seventh transistor T7 is electrically connected to a second node N2. A first electrode plate C1 of the capacitor C is electrically connected to the first node N1, and a second electrode plate C2 of the capacitor C is electrically connected to a first power supply terminal VDD.

FIG. 4 shows an exemplary structure of the first node control sub-circuit. It is easy for those skilled in the art to understand that an implementation mode of the first node control sub-circuit is not limited thereto.

Figure 5:
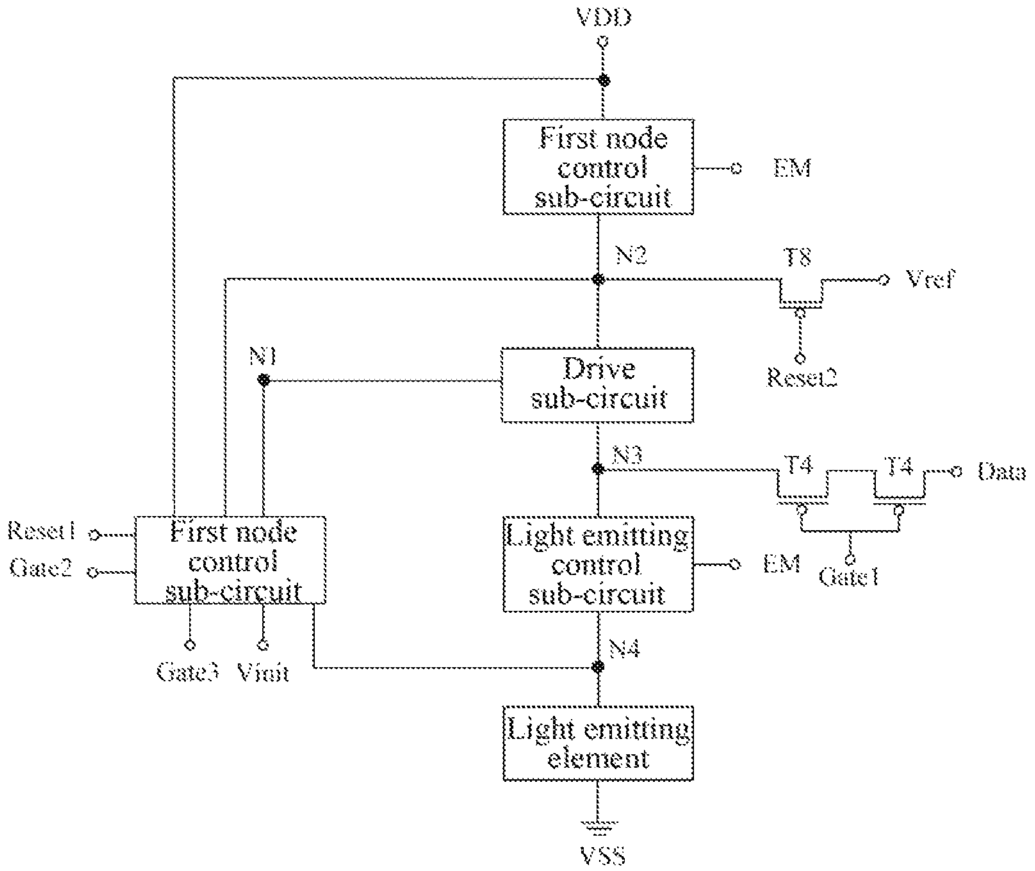
FIG. 5 is an equivalent circuit diagram of a second node control sub-circuit according to an exemplary embodiment.

FIG. 5 is an equivalent circuit diagram of a second node control sub-circuit according to an exemplary embodiment. As shown in FIG. 5, in an exemplary embodiment, a write sub-circuit may include: a fourth transistor T4, and a control sub-circuit may include: an eighth transistor T8.

As shown in FIG. 5, a control electrode of the fourth transistor T4 is electrically connected to a first scan signal terminal Gate1, a first electrode of the fourth transistor T4 is electrically connected to a data signal terminal Data, and a second electrode of the fourth transistor T4 is electrically connected to a third node N3. A control electrode of the eighth transistor T8 is electrically connected to a third scan signal terminal Gate3, a first electrode of the eighth transistor T8 is electrically connected to a reference signal terminal Vref, and a second electrode of the eighth transistor T8 is electrically connected to a second node N2.

In an exemplary embodiment, the write sub-circuit may include: multiple fourth transistors connected in series, wherein, the control electrodes of all the fourth transistors are electrically connected to the first scan signal terminal Gate1, a first electrode of a first fourth transistor T4 is electrically connected to the data signal terminal Data, a second electrode of the ith fourth transistor T4 is electrically connected to the first electrode of the (i+1)th fourth transistor T4, a second electrode of the last fourth transistor T4 is electrically connected to the third node N3. A plurality of fourth transistors connected in series can reduce the leakage current of the pixel circuit, avoid the abnormality of the pixel circuit caused by the failure of one of the fourth transistors to work normally, and improve the reliability of the pixel circuit. FIG. 5 is illustrated by taking the write sub-circuit including two fourth transistors as an example.

FIG. 5 shows an exemplary structure of the second node control sub-circuit. It is easy for those skilled in the art to understand that an implementation mode of the second node control sub-circuit is not limited thereto.

Figure 6:
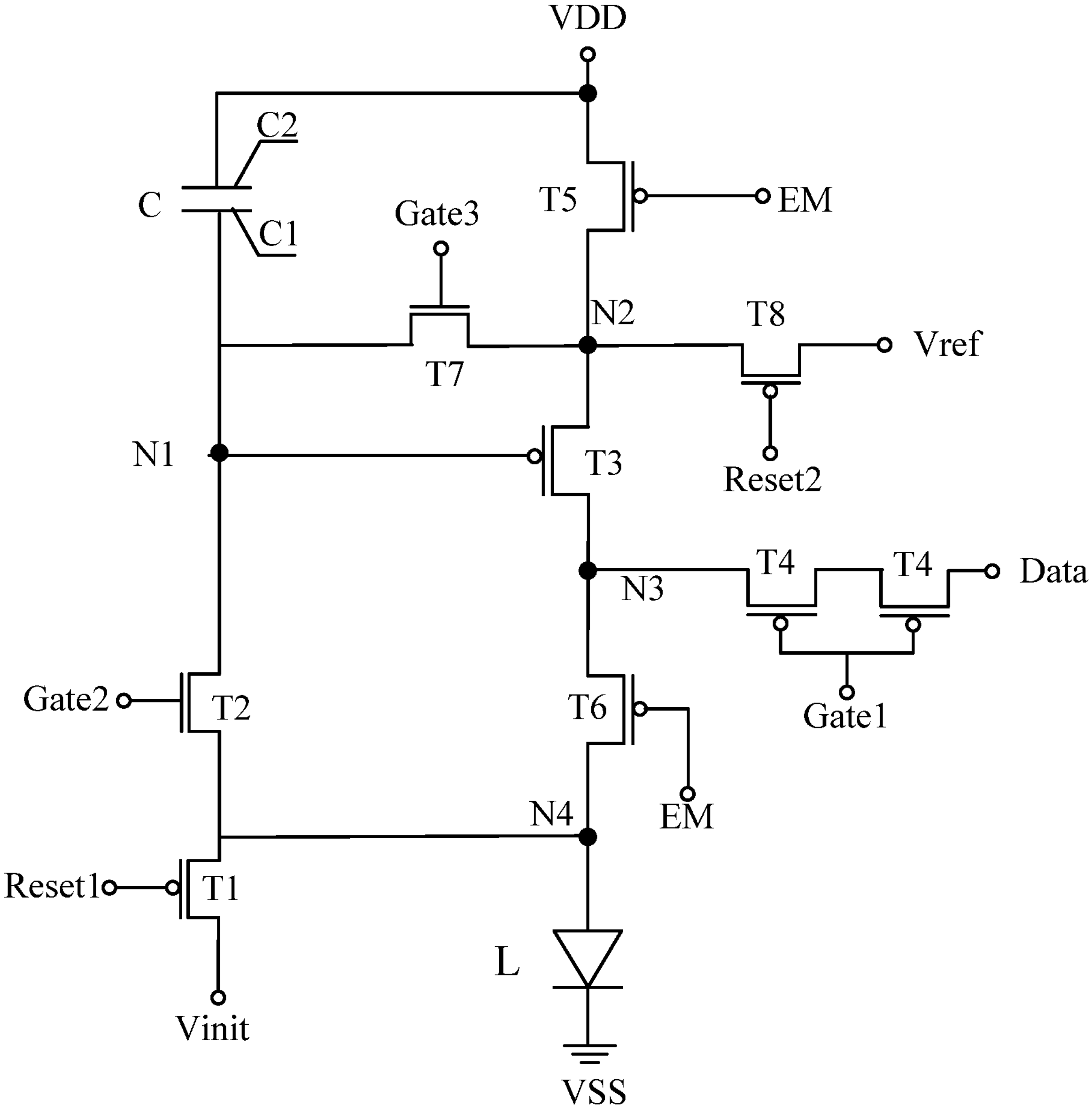
FIG. 6 is a diagram of an equivalent circuit of a pixel circuit provided by an exemplary embodiment.

FIG. 6 is a diagram of an equivalent circuit of a pixel circuit provided by an exemplary embodiment. As shown in FIG. 6, in an exemplary embodiment, a first node control sub-circuit may include: a first transistor T1, a second transistor T2, a seventh transistor T7, and a capacitor C, the capacitor C includes: a first electrode plate C1 and a second electrode plate C2. The second node control sub-circuit may include a fourth transistor T4 and an eighth transistor T8. The drive sub-circuit may include a third transistor T3, and the light emitting control sub-circuit may include a fifth transistor T5 and a sixth transistor T6.

As shown in FIG. 6, a control electrode of the first transistor T1 is electrically connected to a first reset signal terminal Reset1, a first electrode of the first transistor T1 is electrically connected to an initial signal terminal Vinit, and a second electrode of the first transistor T1 is electrically connected to a fourth node N4. A control electrode of the second transistor T2 is electrically connected to a second scan signal terminal Gate2, a first electrode of the second transistor T2 is electrically connected to a first node N1, and a second electrode of the second transistor T2 is electrically connected to the fourth node N4. A control electrode of the third transistor T3 is electrically connected to the first node N1, a first electrode of the third transistor T3 is electrically connected to a second node N2, and a second electrode of the third transistor T3 is electrically connected to a third node N3; A control electrode of the fourth transistor T4 is electrically connected to a first scan signal terminal Gate1, a first electrode of the fourth transistor T4 is electrically connected to a data signal terminal Data, and a second electrode of the fourth transistor T4 is electrically connected to the third node N3. A control electrode of the fifth transistor T5 is electrically connected to a light emitting signal terminal EM, a first electrode of the fifth transistor T5 is electrically connected to a first power supply terminal VDD, and a second electrode of the fifth transistor T5 is electrically connected to the second node N2. A control electrode of the sixth transistor T6 is electrically connected to the light emitting signal terminal EM, the first electrode of the sixth transistor T6 is electrically connected to the third node N3, and the second electrode of the sixth transistor T6 is electrically connected to the fourth node N4. A control electrode of the seventh transistor T7 is electrically connected to a third scan signal terminal Gate3, a first electrode of the seventh transistor T7 is electrically connected to the first node N1, and a second electrode of the seventh transistor T7 is electrically connected to the second node N2. A control electrode of the eighth transistor T8 is electrically connected to the third scan signal terminal Gate3, a first electrode of the eighth transistor T8 is electrically connected to a reference signal terminal Vref, and a second electrode of the eighth transistor T8 is electrically connected to the second node N2. A first electrode plate C1 of the capacitor C is electrically connected to the first node N1, and a second electrode plate C2 of the capacitor C is electrically connected to a first power supply terminal VDD.

In an exemplary embodiment, the third transistor T3 may be referred to as a drive transistor. The third transistor T3 determines a drive current flowing between the first power supply terminal VDD and the second power terminal VSS according to a potential difference between its control electrode and first electrode.

In an exemplary embodiment, the fifth transistor T5 and the sixth transistor T6 may be referred to as light emitting transistors. When the signal at the light emitting signal terminal EM is an valid level signal, the fifth transistor T5 and the sixth transistor T6 enable a light emitting element to emit light by forming a path of drive current between the first power supply line VDD and the second power supply line VSS.

An exemplary structure of the drive sub-circuit and the light emitting control sub-circuit is shown in FIG. 6. It will be readily understood by those skilled in the art that the implementation of the drive sub-circuit and the light emitting control sub-circuit is not limited thereto, and FIG. 6 is illustrated by taking two fourth transistors as examples.

In an exemplary embodiment, some of the first to eighth transistors T1 to T8 may be oxide transistors and some of the transistors may be low temperature polysilicon transistors. Oxide transistor can reduce leakage current, improve the performance of pixel circuit, and reduce the power consumption of pixel circuit.

In an exemplary embodiment, the transistor types of a first transistor T1, a third to a sixth transistors T3 to T6, and an eighth transistor T8 are opposite to the transistor types of a second transistor T2 and a seventh transistor T7. For instance, the first transistor T1, the third transistor T3 to the sixth transistor T6, and the eighth transistor T8 are P-type transistors, and the second transistor T2 and the seventh transistor T7 are N-type transistors.

In an exemplary embodiment, the first transistor T1, the third transistor T3 to the sixth transistor T6, and the eighth transistor T8 may be low temperature polysilicon transistors, and the second transistor T2 and the seventh transistor T7 may be oxide transistors.

In an exemplary embodiment, the second transistor T2 and the seventh transistor T7 connected to the first node N1 are oxide transistors, which can validly reduce the leakage current of the first node N1, maintain the voltage stability of the first node N1, improve the voltage holding capability of the first node in the first driving mode, and improve the reliability of the display substrate.

In an exemplary embodiment, a signal of the data signal terminal Data is written to the third node N3 when a signal of the first scan signal terminal Gate1 is an valid level signal, and the first node N1 and the second node N2 are shorted when the signal of the third scan signal terminal Gate3 is an valid level signal. Thus, the compensation path for the threshold voltage of the drive transistor is to flow from the third node N3 through the second node N2 to the first node N1. The second node N2 writes the signal of the reference signal terminal Vref when the signal of the reset signal terminal Reset is an valid level signal, the signal of reference signal terminal Vref can be dynamically adjusted according to different driving modes. When the pixel circuit is operated in the second driving mode, when the signal of the reset signal terminal Reset is a valid level signal, the signal of the reference signal terminal may be written to a signal having a higher voltage value than that of the signal at the reference signal terminal in the first driving mode. That is, the second node N2 is pre-charged. The charging efficiency of the first node N1 can be improved, and the compensation effect of the threshold voltage of the transistor in the second driving mode can be improved, so that the pixel circuit provided by the present disclosure can meet the requirements of the first driving mode and the second driving mode at the same time.

In an exemplary embodiment, signals of different reference signal terminals Vref may increase the bias magnitude of the gate-source voltage difference of the drive transistor, thereby improving hysteresis variation of the light emitting device due to unidirectional bias.

In an exemplary embodiment, the eighth transistor T8 is connected to the first node N1 through a seventh transistor which is an oxide transistor while being connected to the reference signal terminal Vref and the second node N2, and the first node N1 and the second node N2 are the gate electrode and the source electrode of the drive transistor, respectively. Therefore, the eighth transistor and the seventh transistor are connected in such a way that the gate-source voltage difference of the drive transistor is highly adjustable, and the gate voltage of the drive transistor can be dynamically controlled when different driving modes are switched.

In an exemplary embodiment, the signal of the initial signal terminal Vinit resets the first node N1 and the fourth node N4, wherein, the first transistor T1 controls the signal of the initial signal terminal Vinit to be written into the fourth node N4, and the second transistor T2, which is an oxide transistor, controls the signal of the fourth node N4 to be written into the first node N1. The present disclosure simplifies the pixel circuit by reset the first node N1 and the fourth node N4 through the same initial signal terminal Vinit.

In an exemplary embodiment, when the first reset signal terminal Reset1 and the second reset signal terminal Reset2 are the same signal terminal, the first transistor T1 and the eighth transistor T8 may be provided with signals by a separate drive circuit, and the frame may be held in the first driving mode. A drive circuit for providing signals of the light emitting signal terminal and circuits for providing signals of the first reset signal terminal and the second reset signal terminal are refreshed at high frequency, so that the signal of the fourth node N4 can be reset and the signal of the reference signal terminal can be provided to the second node, thus ensuring the stability of the signals of the second node N2 and the fourth node N4.

Exemplary embodiments of the present disclosure are described below with reference to a working process of the pixel circuit illustrated in FIG. 6.

Figure 7:
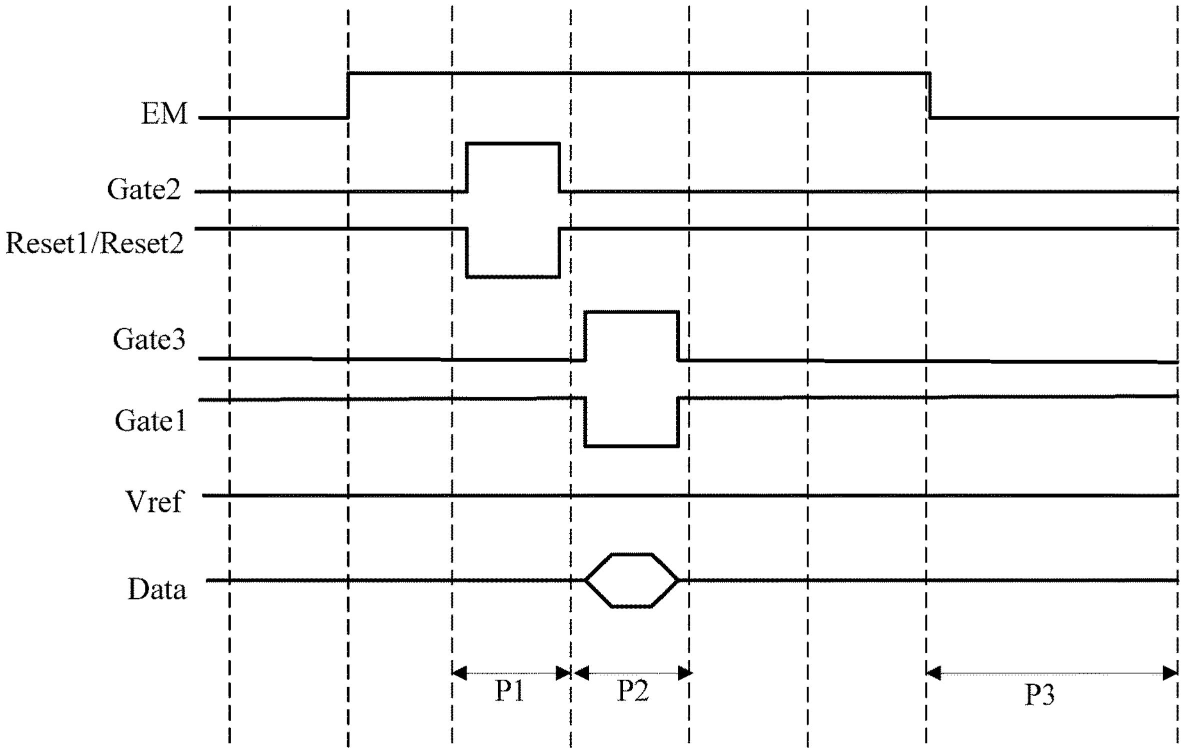
FIG. 7 is a working timing diagram of the pixel circuit provided in FIG. 6.

FIG. 7 is a working timing diagram of the pixel circuit provided in FIG. 6. FIG. 6 shows that the first transistor T1, the third transistor T3 to the sixth transistor T6, and the eighth transistor T8 are P-type transistors, The second transistor T2 and the seventh transistor T7 are N-type transistors. The pixel circuit in FIG. 6 includes a first transistor T1 to an eighth transistor T8, a capacitor C, and 10 signal terminals (a data signal terminal Data, a first scan signal terminal Gate1, a second scan signal terminal Gate2, a third scan signal terminal Gate3, a first reset signal terminal Reset1, a second reset signal terminal Reset2, a light emitting signal terminal EM, an initial signal terminal Vinit, a reference signal terminal Vref, and a first power supply terminal VDD). FIG. 7 illustrates that the first reset signal terminal Reset1 and the second reset signal terminal Reset2 are the same signal terminal. The operation process of the pixel circuit of FIG. 6 may include the following stages.

In the first stage P1, which is referred to as the initialization stage, the signals of the first reset signal terminal Reset1, the second reset signal terminal Reset2 and the third scan signal terminal Gate3 are low-level signals, and the signals of the first scan signal terminal Gate1, the second scan signal terminal Gate2, and the light emitting signal terminal EM are high-level signals. The signals of the first reset signal terminal Reset1 and the second reset signal terminal Reset2 are low-level signals, The signal of the second scan signal terminal Gate2 is a high-level signal. The first transistor T1, the second transistor T2 and the eighth transistor T8 are turned on, the signal of the initial signal terminal Vinit is supplied to the fourth node N4 through the first transistor T1, and is supplied to the first node N1 through the first transistor T1 and the second transistor T2, so as to initialize (reset) the first node N1. The pre-stored voltage inside the first node N1 is emptied to complete the initialization. The signal of the reference signal terminal Vref is supplied to the second node N2 through the eighth transistor T8 to reset the second node N2. The signal of the third scan signal terminal Gate3 is a low-level signal, and the signals of the first scan signal terminal Gate1 and the light emitting signal terminal EM are high-level signals. The fourth transistor T4, the fifth transistor T5, the sixth transistor T6 and the seventh transistor T7 are turned off, and at this stage, the light emitting element L does not emit light.

In a second stage P2, referred to as a data write stage or a threshold compensation stage, the signals of the first scan signal terminal Gate1 and the second scan signal terminal Gate2 are low-level signals, the signals of the third scan signal terminal Gate3, the first reset signal terminal Reset1, the second reset signal terminal Reset2 and the light emitting signal terminal EM are high-level signals, and the data signal terminal Data outputs a data voltage. In this stage, since the signal of the first node N1 is a low-level signal, the third transistor T3 is turned on. The signal of the first scan signal terminal Gate1 is a low-level signal, and the fourth transistor T4 is turned on. The signal of the third scan signal terminal Gate3 is a high-level signal, and the seventh transistor T7 is turned on. The data voltage output by the data signal terminal Data is provided to the first node N1 through the turned-on fourth transistor T4, the third node N3, the turned-on third transistor T3, the second node N2, and the turned-on seventh transistor T7, and the difference between the data voltage output by the data signal terminal Data and the threshold voltage of the third transistor T3 is charged into the capacitor C, until the voltage of the first node N1 is Vd−|Vth|, where Vd is the data voltage output from the data signal terminal Data, and Vth is the threshold voltage of the third transistor T3. The signals of the first reset signal terminal Reset1, the second reset signal terminal Reset2 and the light emitting signal terminal EM are high-level signals, the signals of the second scan signal terminal Gate2 are low-level signals, and the first transistor T1, the second transistor T2, the fifth transistor T5, the sixth transistor T6 and the eighth transistor T8 are turned off. The light emitting element L does not emit light in this stage.

In a third stage P3, referred to as a light emitting stage, the signals of the light emitting signal terminal EM, the second scan signal terminal Gate2 and the third scan signal terminal Gate3 are low-level signals, and the signals of the first scan signal terminal Gate1, the first reset signal terminal Reset1 and the second reset signal terminal Reset2 are high-level signals. the signals of the second scan signal terminal Gate2 and the third scan signal terminal Gate3 are low-level signals, the signals of the first scan signal terminal Gate1, the first reset signal terminal Reset1 and the second reset signal terminal Reset2 are high-level signals, and the first transistor T1, the second transistor T2, the fourth transistor T4, the seventh transistor T7 and the eighth transistor T8 are turned off. The signal of the light emitting signal terminal EM is low-level signal, and the fifth transistor T5 and the sixth transistor T6 are turned on, and a power supply voltage output by the first power supply terminal VDD provides a driving voltage to the first electrode of the light emitting element L through the fifth transistor T5, the third transistor T3 and the sixth transistor T6, which are turned on, to drive the light emitting element L to emit light.

In a drive process of the pixel circuit, a drive current flowing through the third transistor T3 (drive transistor) is determined by a voltage difference between a control electrode and a first electrode of the third transistor T3. Since the voltage of the first node N1 is Vd−|Vth|, the drive current of the third transistor T3 is as follows:

$$I=K^*(Vgs-Vth)^2=K^*[(Vdd-Vd+|Vth|)-Vth]^2=K^*[(Vdd-Vd]^2$$

Among them, I is the drive current flowing through the third transistor T3, that is, the drive current for driving an OLED, K is a constant, Vgs is the voltage difference between the control electrode and the first electrode of the third transistor T3, Vth is the threshold voltage of the third transistor T3, Vd is the data voltage output by the data signal terminal Data, and Vdd is the power supply voltage output by the first power supply terminal VDD.

Through simulation test, the voltage value of the signal at the reference signal terminal of the pixel circuit according to an embodiment of the present disclosure is 6V, and the drive currents under different gray scales (for example, L0, L127 and L255) are approximately the same. Therefore, the pixel circuit according to the embodiment of the present disclosure can meet the write requirements of different grayscale voltages and complete the threshold compensation of the threshold voltage of the drive transistor.

After simulation test, the drive circuits of the pixel circuit according to the embodiment of the present disclosure are roughly the same under the same gray scale (for example, L127) and the voltage values of signals at different reference signal terminals (−1V, 2V, 4V, 6V). Therefore, the pixel circuit according to the embodiment of the present disclosure can be under the same grayscale voltage without being affected by the reference signal terminal Vref.

The voltage value of the signal of the reference signal terminal is 6V, and the drive currents under different gray scales (L0 and L255) are approximately the same. Therefore, the embodiment of the present disclosure can meet the write requirements of different grayscale voltages and complete the threshold compensation of the threshold voltage of the drive transistor.

An embodiment of the present disclosure further provides a display substrate, which includes a base substrate, and a circuit structure layer and a light emitting structure layer sequentially disposed on the base substrate, the light emitting structure layer includes a light emitting element, and the circuit structure layer includes a pixel circuit arranged in an array.

The pixel circuit is the pixel circuit according to any one of the foregoing embodiments, and the implementation principle and implementation effects are similar, which will not be repeated here.

In an exemplary embodiment, the display substrate may be a Low Temperature Polycrystalline Oxide (LTPO) display substrate.

In an exemplary embodiment, the substrate may be a rigid substrate or a flexible substrate, wherein the rigid substrate may be, but is not limited to, one or more of glass and conductive foil; the flexible substrate may be, but is not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers. In an exemplary embodiment, the light emitting structure layer includes an anode layer, a pixel define layer, an organic structure layer, and a cathode layer that are sequentially stacked on a substrate. The anode layer includes an anode, the organic structure layer includes an organic light emitting layer, and the cathode layer includes a cathode.

In an exemplary embodiment, the light emitting element may include a first light emitting element, a second light emitting element, a third light emitting element, and a fourth light emitting element, the first light emitting element emits red light, the second light emitting element emits blue light, and the third and fourth light emitting elements emit green light. The area of the anode of the second light emitting element is greater than the area of the anode of the first light emitting element, and the anode of the third light emitting element is symmetrical with the anode of the fourth light emitting element with respect to a dummy straight line extending in the first direction.

In an exemplary embodiment, the circuit structure layer may further include: multiple first reset signal lines, multiple second reset signal lines, multiple first scan signal lines, multiple second scan signal lines, multiple third scan signal lines, multiple light emitting signal lines, multiple initial signal lines, and multiple reference signal lines extending along a first direction and arranged along a second direction and multiple first power supply lines and multiple data signal lines extending along the second direction and arranged along the first direction, where the first direction intersects the second direction.

A first reset signal line of the pixel circuit is electrically connected to a first reset signal line, a second reset signal terminal is electrically connected to a second reset signal line, a first scan signal terminal is electrically connected to a first scan signal line, a second scan signal terminal is electrically connected to a second scan signal line, a third scan signal terminal is electrically connected to a third scan signal line, a light emitting signal terminal is electrically connected to a light emitting signal line, an initial signal terminal is electrically connected to a initial signal line, a reference signal terminal is electrically connected to a reference signal line, a first power supply terminal is electrically connected to the first power supply line, and a data signal terminal is electrically connected to a data signal line.

In an exemplary embodiment, pixel structures of adjacent pixel circuits located in the same row are symmetrical with respect to a dummy straight line extending in a second direction. An adjacent pixel circuit located in the same row as the pixel circuit includes a first adjacent pixel circuit and a second adjacent pixel circuit.

In an exemplary embodiment, the pixel circuit may include a first transistor to an eighth transistor.

In an exemplary embodiment, the gate electrode of the second transistor is a double gate structure, i.e. the gate electrode of the second transistor includes a first gate electrode and a second gate electrode disposed in different layers. The gate electrode of the second transistor having a double gate structure can improve the conduction capability of the second transistor.

In an exemplary embodiment, the gate electrode of the seventh transistor is a double gate structure, i.e. the gate electrode of the seventh transistor includes a first gate electrode and a second gate electrode disposed in different layers. The gate electrode of the seventh transistor having a double gate structure can improve the conduction capability of the second transistor.

In an exemplary embodiment, the second scan signal line includes a first sub-scan signal line and a second sub-scan signal line arranged in different layers and connected to each other. The first gate electrode of the second transistor is arranged in the same layer as the first sub-scan signal line, and the second gate electrode of the second transistor is arranged in the same layer as the second sub-scan signal line.

In an exemplary embodiment, the first sub-scan signal line and the second sub-scan signal line may be arranged in parallel in a display region of the display substrate and connected to each other in a non-display region.

In an exemplary embodiment, the third scan signal line includes a third sub-scan signal line and a fourth sub-scan signal line arranged in different layers and connected to each other. The first gate electrode of the seventh transistor is arranged in the same layer as the third sub-scan signal line, and the second gate electrode of the seventh transistor is arranged in the same layer as the fourth sub-scan signal line.

In an exemplary embodiment, the third sub-scan signal lines and the fourth sub-scan signal lines may be arranged in parallel in a display region of the display substrate and connected to each other in a non-display region.

In an exemplary embodiment, the pixel circuit further includes: a capacitor, and the capacitor includes: a first electrode plate and a second electrode plate. the circuit structure layer may include: a first semiconductor layer, a first insulation layer, a first conductive layer, a second insulation layer, a second conductive layer, a third insulation layer, a second semiconductor layer, a fourth insulation layer, a third conductive layer, a fourth conductive layer, a first planarization layer and a fifth conductive layer which are sequentially stacked on the base substrate.

In an exemplary embodiment, the first semiconductor layer may include: an active layer of a first transistor, an active layer of a third transistor to an active layer of a sixth transistor and an active layer of an eighth transistor in at least one pixel circuit.

In an exemplary embodiment, the first conductive layer may include: a first reset signal line, a second reset signal line, a first scan signal line, a light emitting signal line, and a first electrode plate of a capacitor, a gate electrode of a first transistor, a gate electrode of a third transistor, a gate electrode of a fourth transistor, a gate electrode of a fifth transistor, a gate electrode of a sixth transistor, and a gate electrode of an eighth transistor located in at least one pixel circuit.

In an exemplary embodiment, the second conductive layer may include: a first sub-scan signal line, a third sub-scan signal line, and a second electrode plate of a capacitor, a first gate electrode of a second transistor and a first gate electrode of a seventh transistor located in at least one pixel circuit;

In an exemplary embodiment, the second semiconductor layer may include: an active layer of a second transistor and an active layer of a seventh transistor located in at least one pixel circuit;

In an exemplary embodiment, the third conductive layer may include: a reference signal line, a second sub-scan signal line, a fourth sub-scan signal line, and a second gate electrode of a second transistor and a second gate electrode of a seventh transistor located in at least one pixel circuit;

In an exemplary embodiment, the fourth conductive layer may include: an initial signal line and a first and second electrodes of a first transistor, a first and second electrodes of a second transistor, a first electrode of a fourth transistor, a first electrode of a fifth transistor, a second electrode of a sixth transistor, a first and second electrodes of a seventh transistor and a first and second electrodes of the eighth transistor located in at least one pixel circuit;

In an exemplary embodiment, the fifth conductive layer may include: a first power supply line, a data signal line and a connection electrode located in at least one pixel circuit, and the light emitting element is connected to the connection circuit.

In an exemplary embodiment, a second reset signal line and a first scan signal line connected to the pixel circuit are located on the same side of a first electrode plate of a capacitor of the pixel circuit, and the second reset signal line is located on a side of the first scan signal line away from the first electrode plate of the capacitor of the pixel circuit; a light emitting signal line and a first reset signal line connected to the pixel circuit are located on a side of the first electrode plate of the pixel circuit away from the first scan signal line, and the first reset signal line is located on a side of the light emitting signal line away from the first electrode plate of the capacitor of the pixel circuit.

In an exemplary embodiment, the display substrate includes: display region and non-display region, the pixel circuit is located in the display region. The display substrate may also include: a scan drive circuit, a light emitting drive circuit and a reset drive circuit located in a non-display region. The scan drive circuit is electrically connected to the first scan signal line, the second scan signal line and the third scan signal line respectively, the light emitting drive circuit is electrically connected to the light emitting signal line respectively, and the reset drive circuit is electrically connected to the first reset signal line and the second reset signal line respectively.

In an exemplary embodiment, a first scan signal line includes a scan main body portion and a scan connection portion, wherein a terminal of the scan connection portion is connected to the scan main body portion; the scan main body portion extends along a first direction, and the scan connection portion is L-shaped.

In an exemplary embodiment, a first reset signal line includes: multiple first reset connection portions and multiple second reset connection portions arranged at intervals, a second reset connection portion is arranged between two adjacent first reset connection portions and is connected to the adjacent two first reset connection portions; a second reset signal line includes multiple third reset connection portions and multiple fourth reset connection portions arranged at intervals, wherein a fourth reset connection portion is arranged between two adjacent third reset connection portions and is connected to the adjacent third reset connection portions; a first reset connection portion and a third reset connection portion extend in a first direction, a second reset connection portion is provided with an opening whose opening direction faces the light emitting signal line, a fourth reset connection portion is provided with an opening whose opening deviates from the first scan signal line, and a dummy straight line extending in a second direction passes through a second reset connection portion of a first reset signal line and a fourth reset connection portion of a second reset signal line.

In an exemplary embodiment, a gate electrode of a first transistor and a first reset connection portion of a first reset signal line are integrally formed, and a gate electrode of an eighth transistor and a fourth reset connection portion of a second reset signal line are integrally formed.

In an exemplary embodiment, second electrode plates of capacitors of adjacent pixel circuits located in the same row are connected.

In an exemplary embodiment, a first sub-scan signal line of a second scan signal line and a third sub-scan signal line of a third scan signal line connected to the pixel circuit are respectively arranged on opposite sides of a second electrode plate of a capacitor of a pixel circuit; a first sub-scan signal line and a first gate electrode of a second transistor are integrally formed, and a third sub-scan signal line and a first gate electrode of a seventh transistor are integrally formed; an orthographic projection of a first sub-scan signal line on a base substrate is located between an orthographic projection of a light emitting signal line on the base substrate and an orthographic projection of a first reset signal line on the base substrate; an orthographic projection of a third sub-scan signal line on the base substrate overlaps with an orthographic projection of a scan connection portion of a first scan signal line on the base substrate, and the orthographic projection on the base substrate is located between an orthographic projection of a scan main body portion of a first scan signal line on the base substrate and an orthographic projection of a second electrode plate of a capacitor of the connected pixel circuit on the base substrate.

In an exemplary embodiment, a second sub-scan signal line and a second gate electrode of a second transistor are integrally formed, and a fourth sub-scan signal line and a second gate electrode of a seventh transistor are integrally formed; an orthographic projection of a second sub-scan signal line on the base substrate at least partially overlaps with an orthographic projection of a first sub-scan signal line on the base substrate; an orthographic projection of a fourth sub-scan signal line on the base substrate at least partially overlaps with an orthographic projection of a third sub-scan signal line on the base substrate; an orthographic projection of a reference signal line on the base substrate partially overlaps with an orthographic projection of a second reset signal line on the base substrate.

In an exemplary embodiment, a fifth insulation layer includes: patterns of multiple via holes, the patterns of the multiple via holes include: a first via hole to a sixth via hole provided on a first insulation layer to a fifth insulation layer, a seventh via hole provided on a second to fifth insulation layers, an eighth via hole provided on a third to fifth insulation layers, a ninth via hole and a tenth via hole provided on a fourth and fifth insulation layers, and an eleventh via hole provided on the fifth insulation layer, wherein, tan eighth via hole exposes a second electrode plate of a capacitor, and an eleventh via hole exposes a reference signal line.

In an exemplary embodiment, a dummy straight line extending in a second direction passes through an eighth via hole and an eleventh via hole.

In an exemplary embodiment, an eighth via hole of the pixel circuit is the same via hole as an eighth via hole of the first adjacent pixel circuit, and an eleventh via hole of the pixel circuit is the same via hole as an eleventh via hole of the first adjacent pixel circuit.

In an exemplary embodiment, a first electrode of a fifth transistor of the pixel circuit is the same via hole as a first electrode of a fifth transistor of the first adjacent pixel circuit, and a first electrode of an eighth transistor of the pixel circuit is the same via hole as a first electrode of an eighth transistor of the first adjacent pixel circuit.

In an exemplary embodiment, an orthographic projection of an initial signal line on the base substrate partially overlaps with an orthographic projection of a second reset connection portion of a first reset signal line on the base substrate.

In an exemplary embodiment, a second electrode of a first transistor, a second electrode of a second transistor and a second electrode of a sixth transistor are integrally formed, and an orthographic projections on the base substrate partially overlap with the orthographic projections of a second scan signal line and a light emitting signal line on the base substrate.

An orthographic projection of a first electrode of a fifth transistor on the base substrate partially overlaps with an orthographic projection of s light emitting signal line connected to s second electrode plate of a capacitor and the pixel circuit on the base substrate, and the first electrode of the fifth transistor includes an opening facing a second scan signal line connected to the pixel circuit;

a first electrode of a second transistor and a first electrode of a seventh transistor are integrally formed, and the orthographic projections on the base substrate partially overlap with an orthographic projection of a light emitting signal line connected to a second electrode plate of a capacitor and the pixel circuit on the base substrate;

a second electrode of a seventh transistor and a second electrode of a eighth transistor are integrally formed, and the orthographic projections on the base substrate partially overlap with the orthographic projections of a first scan signal line connected to the pixel circuit and a third scan signal line connected to the pixel circuit on the base substrate;

an orthographic projection of a first electrode of an eighth transistor on the base substrate partially overlaps with an orthographic projection of a reference signal line connected to the pixel circuit on the base substrate.

In an exemplary embodiment, a first power supply line connected to the pixel circuit is the same power supply line as a first power supply line connected to the first adjacent pixel circuit.

In an exemplary embodiment, a data signal line and a first power supply line connected to the pixel circuit are respectively located on two sides of a connection electrode, and a length of the first power supply line along a first direction is greater than a length of the data signal line along the first direction.

In an exemplary embodiment, a first power supply line connected to the pixel circuit may include: a first power supply portion, a second power supply portion and a third power supply portion arranged in sequence along a second direction, wherein the second power supply portion is connected to the first power supply portion and the third power supply portion, respectively; a length of the third power supply portion along a first direction is greater than a length of the first power supply portion along the first direction, and a length of the first power supply portion along the first direction is greater than a length of the second power supply portion along the first direction; a connection electrode of the pixel circuit is located on a side of the second power supply portion of the pixel circuit near the data signal line connected to the pixel circuit.

In an exemplary embodiment, an orthographic projection of a first power supply line on the base substrate partially overlaps with the orthographic projections of an integrated structure of a first electrode of a fifth transistor, a first electrode of a first transistor, a first electrode of a second transistor, and a first electrode of a seventh transistor and an integrated structure of a second electrode of a seventh transistor and a second electrode of an eighth transistor on the base substrate.

The structure of the display substrate will be described below through an example of a manufacturing process of the display substrate. A "patterning process" mentioned in the present disclosure includes processes such as film deposition, photoresist coating, mask exposure, development, etching, and photoresist stripping. Deposition may be any one or more of sputtering, evaporation, and chemical vapor deposition. Coating may be any one or more of spray coating and spin coating. Etching may be any one or more of dry etching and wet etching. A "thin film" refers to a layer of a thin film prepared from a material on a base substrate using a process of deposition or coating. If no patterning process is needed for the "thin film" in the whole making process, the "thin film" may also be called a "layer". If the patterning process is needed for the "thin film" in the whole making process, the thin film is called a "thin film" before the patterning process and called a "layer" after the patterning process. The "layer" after the patterning process includes at least one "pattern". "A and B are arranged in the same layer" in the present disclosure refers to that A and B are simultaneously formed by the same patterning process.

Figure 8:
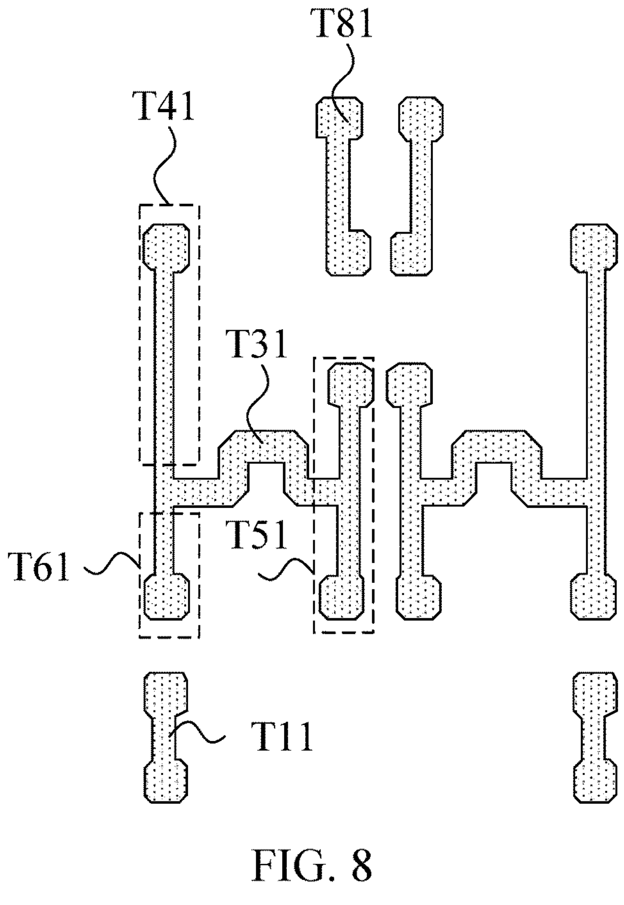
FIG. 8 is a schematic diagram after a pattern of a first semiconductor layer is formed.

FIG. 8 to FIG. 18B are schematic diagrams of a preparation process of a display substrate according to an exemplary embodiment. FIG. 8 to FIG. 18B are illustrated by taking pixel circuits of one row and two columns as an example. As shown in FIGS. 8 to 18B, a preparation process of a display substrate provided by an exemplary embodiment may include:

(1) Forming a pattern of a first semiconductor layer on a base substrate, including: a first semiconductor thin film is deposited on the base substrate, and the first semiconductor thin film is patterned through a patterning process to form a pattern of a first semiconductor layer, as shown in FIG. 8, which is a schematic diagram after the pattern of a first semiconductor layer is formed.

In an exemplary embodiment, as shown in FIG. 8, the first semiconductor layer may include an active layer T11 of a first transistor, an active layer T31 of a third transistor, an active layer T41 of a fourth transistor, an active layer T51 of a fifth transistor, an active layer T61 of a sixth transistor, and an active layer T81 of an eighth transistor located in at least one pixel circuit.

In an exemplary embodiment, the active layer T31 of the third transistor to the active layer T61 of the sixth transistor may be integrally formed.

In an exemplary embodiment, the active layer T31 of the third transistor may be "π"-shaped.

In an exemplary embodiment, the sides of the active layer of the third transistor include a first side, a second side, a third side, and a fourth side, wherein the first side and the second side are oppositely disposed, and the third side and the fourth side are oppositely disposed. The active layer T41 of the fourth transistor and the active layer T61 of the sixth transistor are located on the first side of the active layer T31 of the third transistor and extend in the second direction. The active layer T51 of the fifth transistor is located on the second side of the active layer T31 of the third transistor and extends in the second direction. The active layer T11 of the first transistor is located on a third side of the active layer T31 of the third transistor and extends in a second direction. The active layer T81 of the eighth transistor is located on the fourth side of the active layer T31 of the third transistor and extends in the second direction.

Figure 9A:
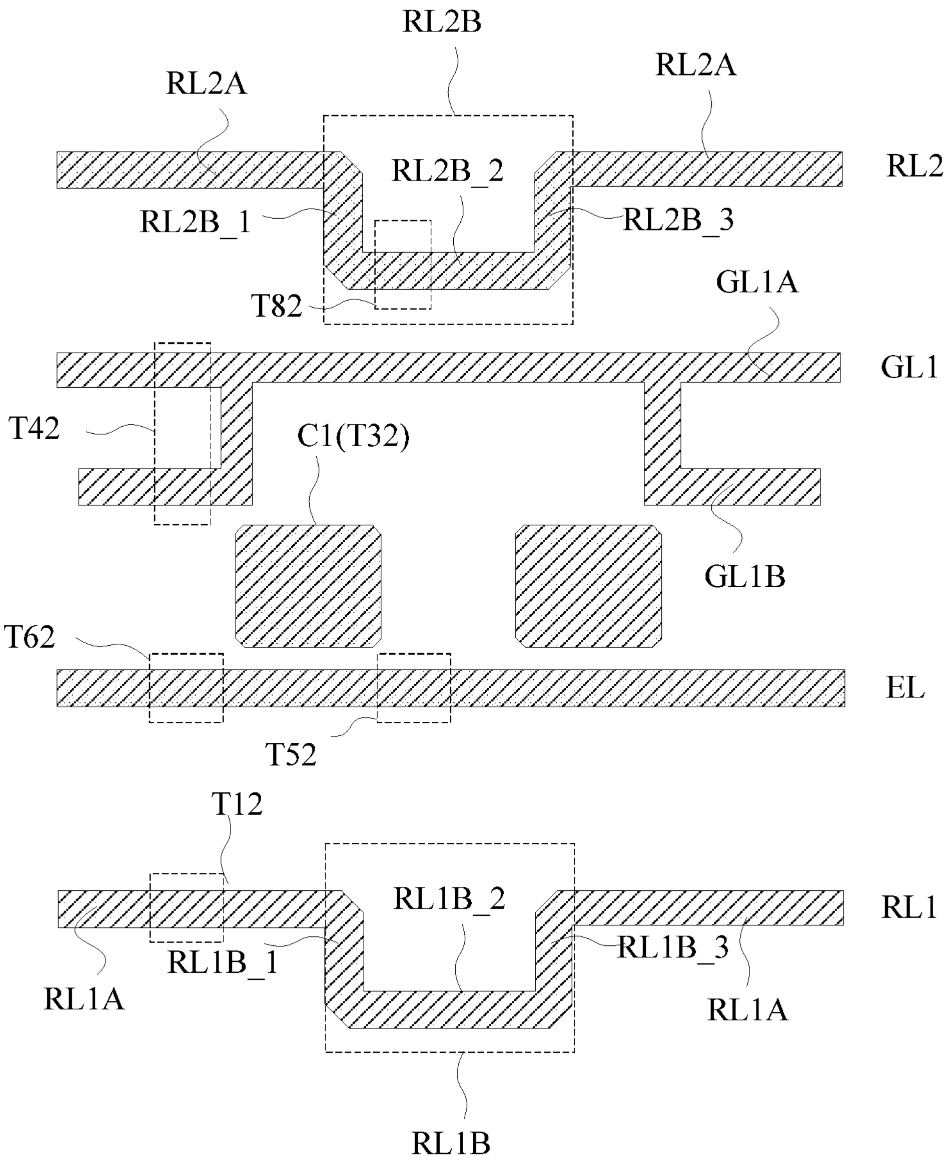
FIG. 9A is a schematic diagram of a pattern of a first conductive layer.
Figure 9B:
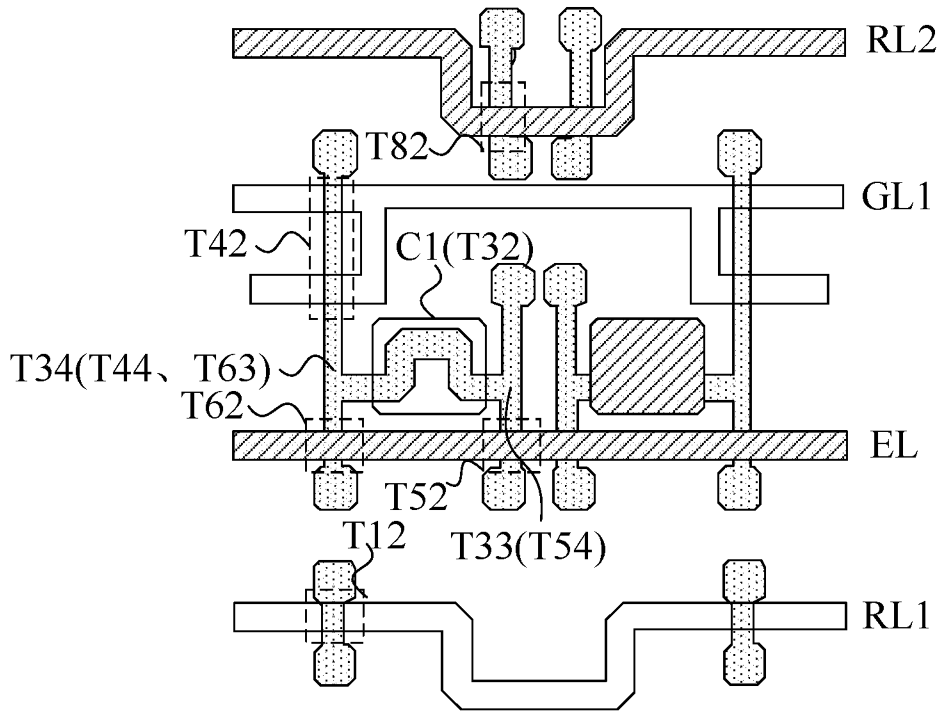
FIG. 9B is a schematic diagram after a pattern of a first conductive layer is formed.

(2) Forming a pattern of a first conductive layer, includes: on the substrate on which the pattern is formed, a first insulation thin film and a first conductive thin film are sequentially deposited, the first insulation thin film and the first conductive thin film are patterned through a patterning process to form a pattern of a first insulation layer and a pattern of a first conductive layer on the first insulation layer, as shown in FIGS. 9A and 9B, wherein, FIG. 9A is a schematic diagram of the pattern of the first conductive layer and FIG. 9B is a schematic diagram after the pattern of a first conductive layer is formed.

In an exemplary embodiment, as shown in FIGS. 9A and 9B, the first conductive layer may include: a first reset signal line RL1, a second reset signal line RL2, a first scan signal line GL1, a light emitting signal line EL, and a first electrode plate C1 of a capacitor, a gate electrode T12 of a first transistor, a gate electrode T32 of a third transistor, a gate electrode T42 of a fourth transistor, a gate electrode T52 of a fifth transistor, a gate electrode T62 of a sixth transistor, and a gate electrode T82 of an eighth transistor located in at least one pixel circuit.

In an exemplary embodiment, as shown in FIGS. 9A to 9B, a second reset signal line RL2 and a first scan signal line GL1 connected to the pixel circuit are located on the same side of a first electrode plate C1 of a capacitor of the pixel circuit, and the second reset signal line RL2 is located on a side of the first scan signal line GL1 away from the first electrode plate C1 of the capacitor of the pixel circuit. A light emitting signal line EL and a first reset signal line RL1 connected to the pixel circuit are located on a side of the first electrode plate C1 of the pixel circuit away from the first scan signal line GL1, and the first reset signal line RL1 is located on a side of the light emitting signal line EL away from the first electrode plate C1 of the capacitor of the pixel circuit.

In an exemplary embodiment, a first reset signal line RL1 and a second reset signal line RL2 have the same shape and provide the same signals.

In an exemplary embodiment, a first reset signal line RL1 may include: multiple first reset connection portions RL1A and multiple second reset connection portions RL1B arranged at intervals, a second reset connection portion RL1B is arranged between two adjacent first reset connection portions RL1A and is connected to the adjacent two first reset connection portions RL1A.

In an exemplary embodiment, as shown in FIG. 9A, a first reset connection RL1A extends in a first direction.

In an exemplary embodiment, as shown in FIG. 9A, the second reset connection portion RL1B is provided with an opening and the opening direction is toward the light emitting signal line EL.

In an exemplary embodiment, As shown in FIG. 9A, the second reset connection portion RL1B may include: a first sub-connection portion RL1B_1, a second sub-connection portion RL1B_2 and a third sub-connection portion RL1B_3. The first sub-connection portion RL1B_1 and the third sub-connection portion RL1B_3 extend in the second direction, and the second sub-connection portion RL1B_2 extends in a first direction. The first sub-connection portion RL1B_1 is connected to the first reset connection portion RL1A and the second sub-connection portion RL1B_2 adjacent to one of the second reset connection portions RL1B, respectively, and the third sub-connection portion RL1B_3 is connected to the first reset connection portion RL1A adjacent to the second sub-connection portion RL1B_2 and the second reset connection portion RL1B, respectively.

In an exemplary embodiment, the second reset signal line RL2 may include multiple third reset connection portions RL2A and multiple fourth reset connection portions RL2B arranged at intervals, the fourth reset connection portions RL2B is disposed between two adjacent third reset connection portions RL2A and are connected to the adjacent two third reset connection portions RL2A.

In an exemplary embodiment, the third reset connection portion RL2A extends along the first direction.

In an exemplary embodiment, as shown in FIG. 9A, the fourth reset connection portion RL2B is provided with an opening facing away from the first scan signal line GL1.

In an exemplary embodiment, As shown in FIG. 9A, the fourth reset connection portion RL2B may include: a first sub-connection portion RL2B_1, a second sub-connection portion RL2B_2 and a third sub-connection portion RL2B_3. The first sub-connection portion RL2B_1 and the third sub-connection portion RL2B_3 extend in the second direction, and the second sub-connection portion RL2B_2 extends in the first direction. The first sub-connection portion RL2B_1 is respectively connected to the third reset connection portion RL2A and the second sub-connection portion RL2B_2 adjacent to one of the fourth reset connection portion RL2B. The third sub-connection portion RL2B_3 is respectively connected to the second sub-connection portion RL2B_2 and another adjacent third reset connection portion RL2A of the fourth reset connection portion RL2B.

In an exemplary embodiment, a dummy straight line extending in the second direction passes through a second reset connection portion RL1B of the first reset signal line RL1 and a fourth reset connection portion RL2B of the second reset signal line RL2.

In an exemplary embodiment, a first scan signal line GL1 includes a scan main body portion GLIA and a scan connection portion GLIB, wherein a terminal of the scan connection portion GLIB is connected to the scan main body portion GLIA. The scan main body portion GLIA extends in a first direction, and the scan connection portion GLIB has an "L" shape.

In an exemplary embodiment, as shown in FIGS. 9A and 9B, for any pixel circuit, the gate electrode T12 of the first transistor and the first reset connection portion RL1A of the first reset signal line RL1 connected to the pixel circuit are integrally formed, the gate electrode T32 of the third transistor and the first electrode plate C1 of the capacitor are integrally formed, the gate electrode T42 of the fourth transistor and the first scan signal line GL1 connected to the pixel circuit are integrally formed, the gate electrode T52 of the fifth transistor, the gate electrode T62 of the sixth transistor, and the light emitting signal line EL connected to the pixel circuit are integrally formed, and the gate electrode T82 of the eighth transistor and the fourth reset connection portion RL2B of the second reset signal line RL2 connected to the pixel circuit are integrally formed.

In an exemplary embodiment, a gate electrode T12 of the first transistor is provided across an active layer of the first transistor, a gate electrode T32 of the third transistor is provided across the active layer of the third transistor, a gate electrode T42 of the fourth transistor is provided across the active layer of the fourth transistor, a gate electrode T52 of the fifth transistor is provided across the active layer of the fifth transistor, a gate electrode T62 of the sixth transistor is provided across the active layer of the first transistor, and a gate electrode T82 of the eighth transistor is provided across the active layer of the eighth transistor, that is, the extension direction of the gate electrode of at least one transistor is perpendicular to the extension direction of the active layer.

In an exemplary embodiment, this process further includes a conductive processing. Conducting treatment is to use the semiconductor layer of the control electrode shielding region of multiple transistors (that is, the region where the semiconductor layer overlaps with the control electrode) as the channel region of the transistor after the pattern of the first conductive layer is formed. The semiconductor layer in the region not covered by the first conductive layer is processed into a conductive layer to form the first electrode connection portion and the second electrode connection portion of the transistor. As shown in FIG. 9B, the first electrode connection portion of the active layer of the third transistor may be multiplexed into the first electrode T63 of the sixth transistor, the second electrode T44 of the fourth transistor, and the second electrode T34 of the third transistor. The second electrode connection portion of the active layer of the third transistor may be multiplexed into the second electrode T54 of the fifth transistor and the first electrode T33 of the third transistor.

Figure 10A:
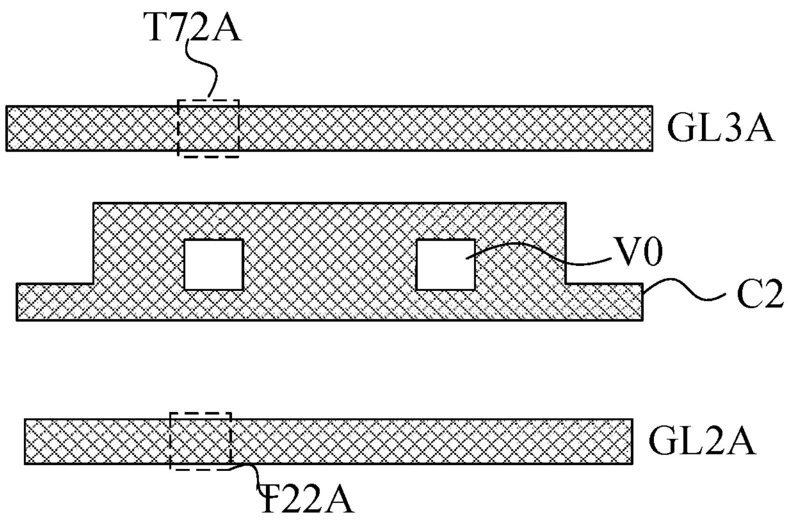
FIG. 10A is a schematic diagram of a pattern of a second conductive layer.
Figure 10B:
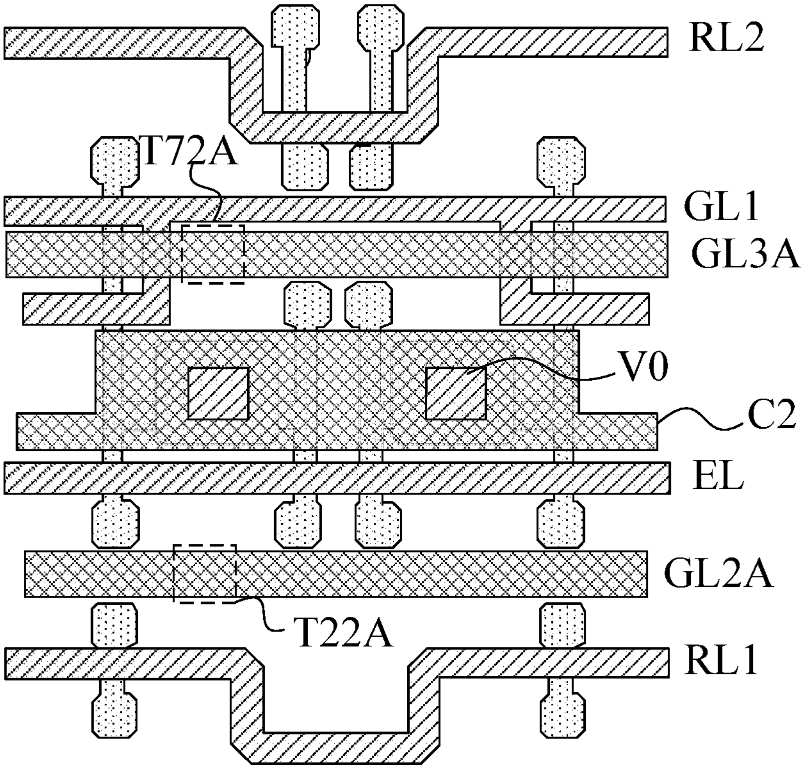
FIG. 10B is a schematic diagram after a pattern of a second conductive layer is formed.

(3) Forming a pattern of a second conductive layer, includes: on the base substrate on which the pattern is formed, a second insulation thin film and a second conductive thin film are sequentially deposited, the second insulation thin film and the second conductive thin film are patterned through a patterning process to form a pattern of a second insulation layer and a pattern of a second conductive layer on the second insulation layer, as shown in FIGS. 10A and 10B, wherein FIG. 10A is a schematic diagram of the pattern of the second conductive layer and FIG. 10B is a schematic diagram after the pattern of the second conductive layer is formed.

In an exemplary embodiment, as shown in FIGS. 10A and 10B, the second conductive layer may include a first sub-scan signal line GL2A, a third sub-scan signal line GL3A, and a second electrode plate C2 of a capacitor located in at least one pixel circuit, a first gate electrode T22A of a second transistor, and a first gate electrode T72A of a seventh transistor.

In an exemplary embodiment, the first gate electrode T22A of the second transistor is integrally formed with the first sub-scan signal line GL2A, and the first gate electrode T72A of the seventh transistor is integrally formed with the third sub-scan signal line GL3A.

In an exemplary embodiment, as shown in FIGS. 10A and 10B, the first sub-scan signal line GL2A of the second scan signal line GL2 and the third sub-scan signal line GL3A of the third scan signal line GL3 connected to the pixel circuit are respectively located on opposite sides of the second electrode plate C2 of the capacitor of the pixel circuit. That is, a first sub-scan signal line GL2A of the second scan signal line GL2 connected to the pixel circuit is located on one side of the second electrode plate of the capacitor of the pixel circuit, and a third sub-scan signal line GL3A of the third scan signal line GL3 connected to the pixel circuit is located on the other side of the second electrode plate C2 of the capacitor of the pixel circuit.

In an exemplary embodiment, an orthographic projection of the second electrode plate C2 of the capacitor of the pixel circuit on the base substrate at least partially overlaps an orthographic projection of the first electrode plate of the capacitor on the base substrate, and the second electrode plate C2 of the capacitor is provided with the a via hole V0 exposing the first electrode plate of the capacitor.

In an exemplary embodiment, an orthographic projection of a third sub-scan signal line GL3A on the base substrate overlaps with an orthographic projection of a scan connection portion of a first scan signal line GL1 on the base substrate, and the orthographic projection on the base substrate is located between an orthographic projection of a scan main body portion of a first scan signal line GL1 on the base substrate and an orthographic projection of a second electrode plate C2 of a capacitor of the connected pixel circuit on the base substrate.

In an exemplary embodiment, an orthographic projection of a first sub-scan signal line GL2A on a base substrate is located between an orthographic projection of a light emitting signal line EL on the base substrate and an orthographic projection of a first reset signal line RL1 on the base substrate; and there is no overlapping region with an orthographic projection of an active layer of a sixth transistor and an active layer of a first transistor on the base substrate.

In an exemplary embodiment, second electrode plates of capacitors C2 of adjacent pixel circuits located in the same row are connected. The second electrode plates C2 of capacitors of adjacent pixel circuits located in the same row are electrically connected to improve the uniformity of display on the display substrate.

Figure 11A:
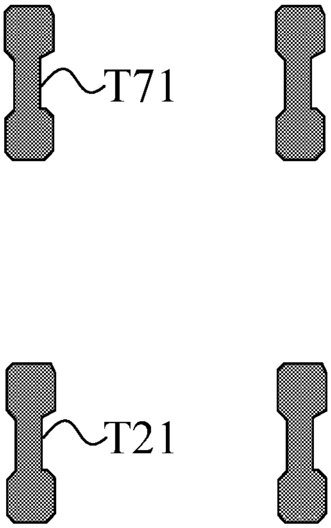
FIG. 11A is a schematic diagram of pattern of a second semiconductor layer.
Figure 11B:
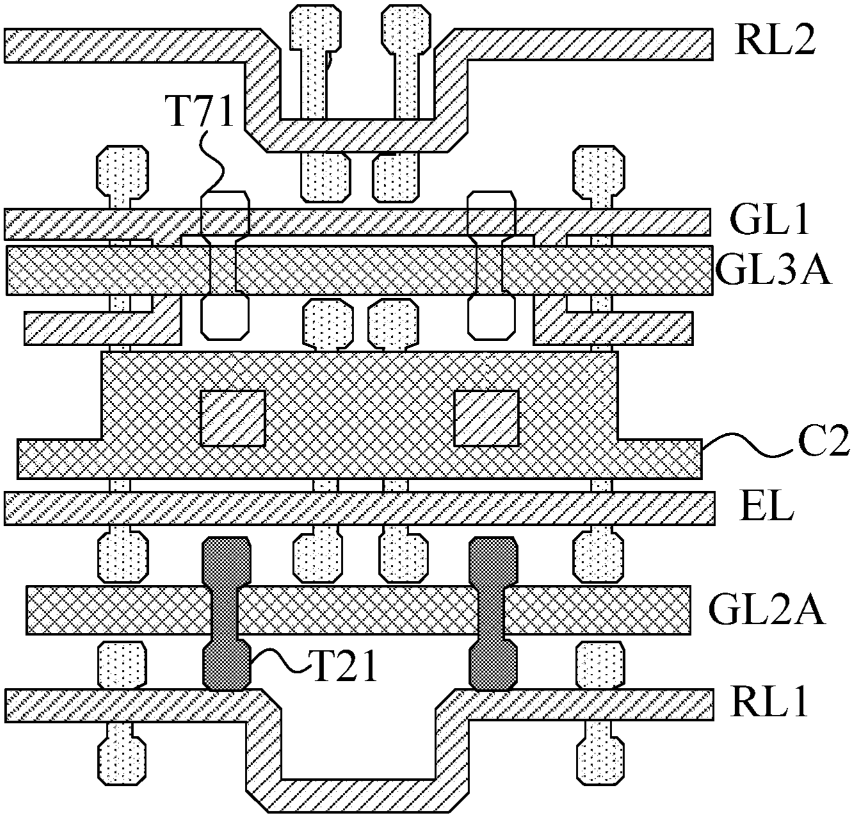
FIG. 11B is a schematic diagram after a pattern of a second semiconductor layer is formed.

(4) Forming a pattern of a second semiconductor layer, which includes: on the base substrate on which the pattern is formed, includes: a third insulation thin film and a second semiconductor thin film on are sequentially deposited on a base substrate, the third insulation thin film and the second semiconductor thin film are patterned through a patterning process to form a pattern of a third insulation layer and a pattern of a second semiconductor layer on the third insulation layer, as shown in FIGS. 11A and 11B, wherein FIG. 11A is a schematic diagram of the pattern of the second semiconductor layer and FIG. 11B is a schematic diagram after the pattern of the second semiconductor layer is formed.

In an exemplary embodiment, as shown in FIGS. 11A to 11B, the second semiconductor layer may include: an active layer T21 of a second transistor and an active layer of a seventh transistor T71 located in at least one pixel circuit;

In an exemplary embodiment, as shown in FIGS. 11A and 11B, the active layer T21 of the second transistor and the active layer T71 of the seventh transistor extend in the second direction, and a dummy straight line extending in the second direction passes through the active layer T21 of the second transistor and the active layer T71 of the seventh transistor.

In an exemplary embodiment, the active layer T21 of the second transistor is disposed across the first gate electrode of the second transistor, and the active layer T71 of the seventh transistor is disposed across the first gate electrode of the seventh transistor.

Figure 12A:
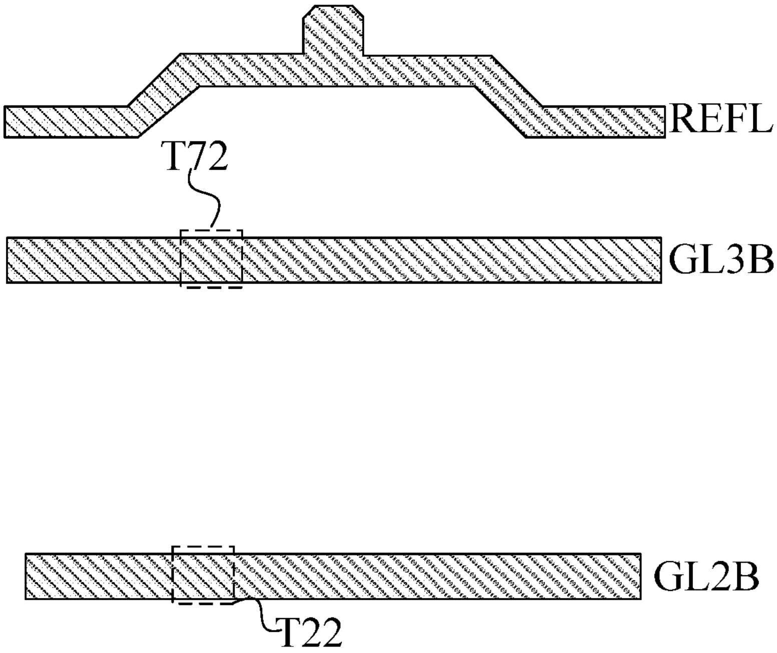
FIG. 12A is a schematic diagram of a pattern of a third conductive layer.
Figure 12B:
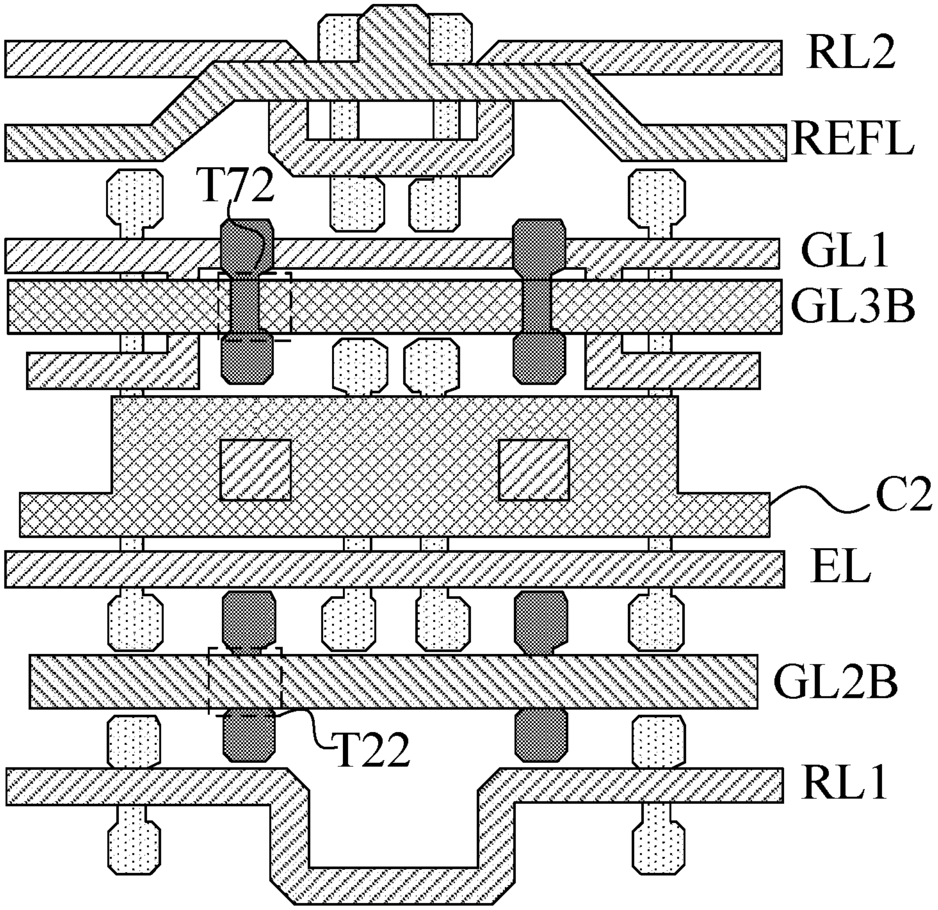
FIG. 12B is a schematic diagram after a pattern of a third conductive layer is formed.

(5) Forming a third conductive layer, which includes: on the substrate on which the aforementioned patterns are formed, a fourth insulation thin film and a third conductive thin film are sequentially deposited, the fourth insulation thin film and the third conductive thin film are patterned through a patterning process to form a pattern of a fourth insulation layer and a pattern of a third conductive layer on the fourth insulation layer, as shown in FIG. 12A and FIG. 12B, FIG. 12A is a schematic diagram of a pattern of a third conductive layer, and FIG. 12B is a schematic diagram after a pattern of a third conductive layer is formed.

In an exemplary embodiment, as shown in FIGS. 12A and 12B, the third conductive layer may include: a reference signal line REFL, a second sub-scan signal line GL2B, a fourth sub-scan signal line GL3B, and a second gate electrode T22B of a second transistor and a second gate electrode of a seventh transistor T72B located in at least one pixel circuit.

In an exemplary embodiment, as shown in FIGS. 12A and 12B, the second gate electrode T22B of the second transistor is integrally formed with the second sub-scan signal line GL2B. The gate electrode T72B of the seventh transistor is integrally formed with the fourth sub-scan signal line GL3B.

In an exemplary embodiment, as shown in FIGS. 12A and 12B, an orthographic projection of the reference signal line REFL on the base substrate partially overlaps with an orthographic projection of the second reset signal line RL2 and the active layer of the eighth transistor on the base substrate.

In an exemplary embodiment, as shown in FIGS. 12A and 12B, an orthographic projection of a second sub-scan signal line GL2B on the base substrate at least partially overlaps an orthographic projection of a first sub-scan signal line on the base substrate. In an exemplary embodiment, as shown in FIGS. 12A and 12B, an orthographic projection of a fourth sub-scan signal line GL3B on the base substrate at least partially overlaps with an orthographic projection of a third sub-scan signal line on the base substrate.

In an exemplary embodiment, the second gate electrode T22B of the second transistor is disposed across the active layer of the second transistor, and the second gate electrode T72B of the seventh transistor is disposed across the active layer of the seventh transistor.

Figure 13A:
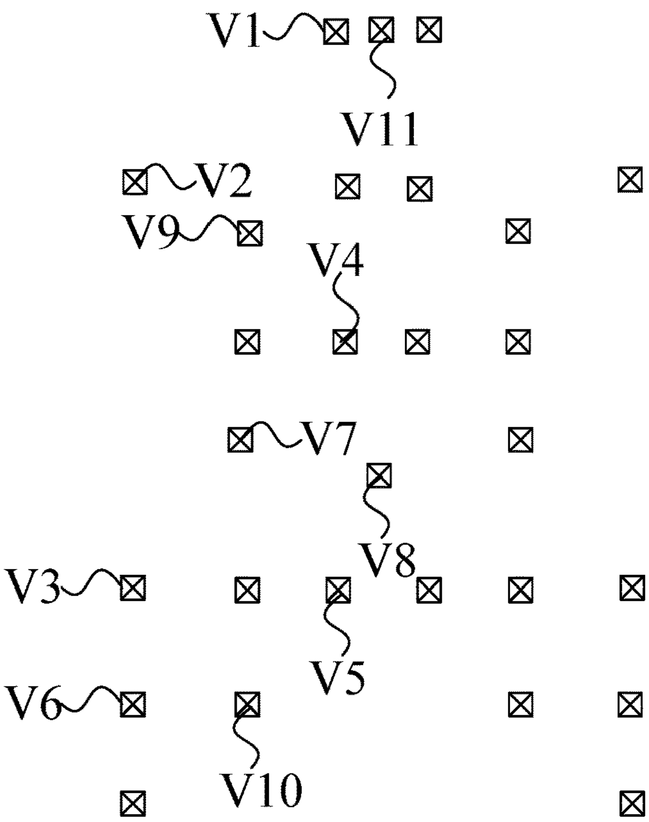
FIG. 13A is a schematic diagram of a pattern of a fifth insulation layer.
Figure 13B:
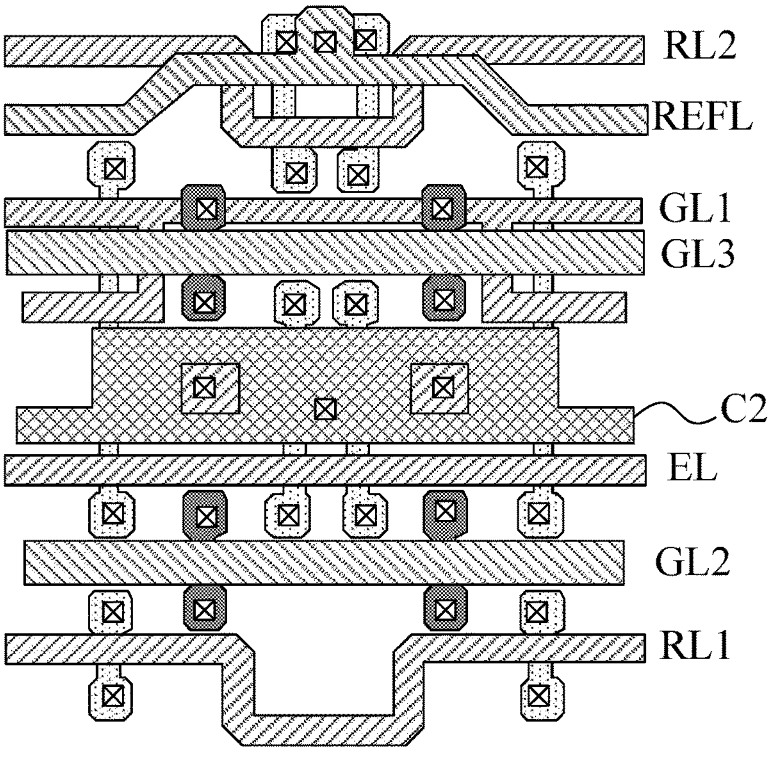
FIG. 13B is a schematic diagram after a pattern of a fifth insulation layer is formed.

(6) Forming a pattern of a fifth insulation layer, which includes: on a substrate on which the aforementioned patterns are formed, a fifth insulation thin film is deposited, and the fifth insulation thin film is patterned through a patterning process to form a pattern of a fifth insulation layer covering the aforementioned pattern, and the fifth insulation layer is provided with patterns of multiple via holes, as shown in FIGS. 13A to 13B, FIG. 13A is a schematic diagram of a pattern of a fifth insulation layer, and FIG. 13B is a schematic diagram after a pattern of a fifth insulation layer is formed.

In an exemplary embodiment, as shown in FIG. 13A, the patterns of the multiple via holes include: a first via hole V1 to a sixth via hole V6 provided on the first to fifth insulation layers, a seventh via V7 provided on the second to fifth insulation layers, an eighth via V8 provided on the third to fifth insulation layers, a ninth via V9 and a tenth via V10 provided on the fourth and fifth insulation layers, and an eleventh via V11 provided on the fifth insulation layer. The first via hole V1 exposes the active layer of the eighth transistor, the second via hole V2 exposes the active layer of the fourth transistor, and the third via hole V3 exposes the active layer of the sixth transistor, the fourth via hole V4 exposes the active layer of the fifth transistor, the fifth via hole V5 exposes the first electrode of the third transistor, the sixth via V6 exposes the active layer of the first transistor, the seventh via V7 exposes the first electrode plate of the capacitor, the eighth via V8 exposes the second electrode plate of the capacitor, and the ninth via V9 exposes the active layer of the seventh transistor, the tenth via hole 10 exposes the active layer of the second transistor, and the eleventh via hole V11 exposes the reference signal line REFL.

In an exemplary embodiment, as shown in FIGS. 13A and 13B, an adjacent pixel circuit located in the same row as the pixel circuit includes a first adjacent pixel circuit and a second adjacent pixel circuit, an eighth via hole of the pixel circuit is the same via hole as an eighth via hole of the first adjacent pixel circuit, and an eleventh via hole of the pixel circuit is the same via hole as an eleventh via hole of the first adjacent pixel circuit. The eighth via hole of the pixel circuit is the same as the eighth via hole of the first adjacent pixel circuit, and the eleventh via hole of the pixel circuit is the same as the eleventh via hole of the first adjacent pixel circuit, which can simplify the manufacturing process of the display substrate.

In an exemplary embodiment, as shown in FIGS. 13A and 13B, a dummy straight line extending in the second direction passes through the eighth via V8 and the eleventh via V11.

Figure 14A:
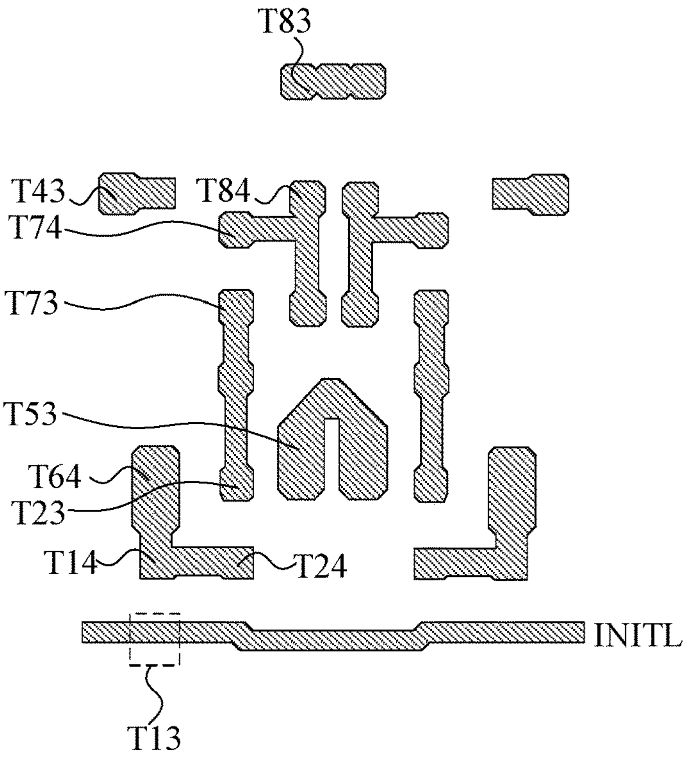
FIG. 14A is a schematic diagram of a pattern of a fourth conductive layer.
Figure 14B:
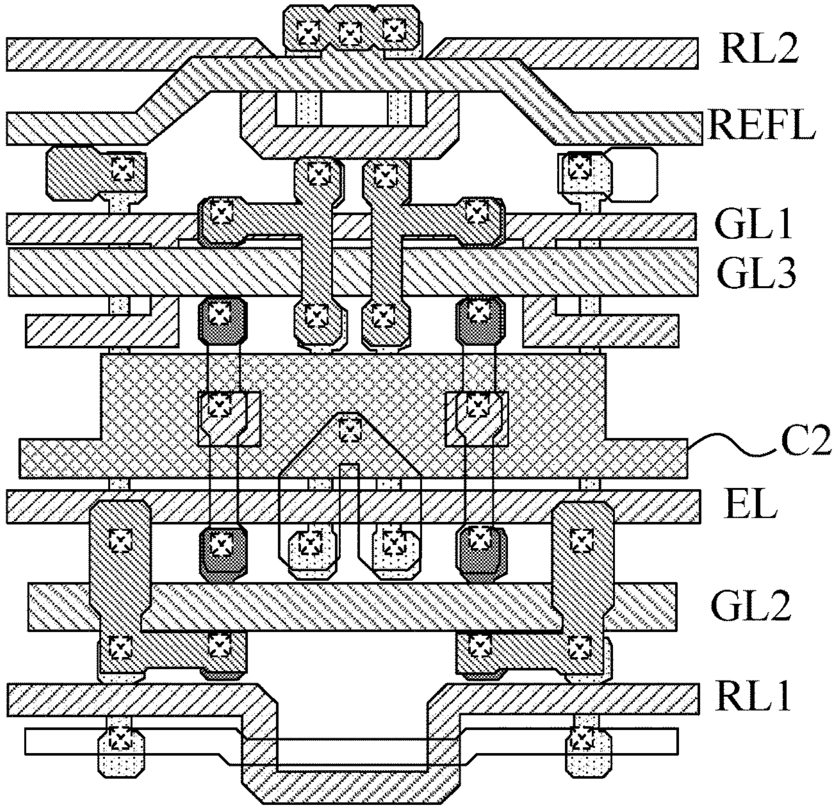
FIG. 14B is a schematic diagram after a pattern of a fourth conductive layer is formed.

(7) Forming a pattern of a fourth conductive layer, which includes: on the base substrate on which the aforementioned patterns are formed, a fourth conductive thin film is deposited, and the fourth conductive thin film is patterned through a patterning process to form a pattern of a fourth conductive layer, as shown in FIG. 14A and FIG. 14B, FIG. 14A is a schematic diagram of a pattern of a fourth conductive layer, and FIG. 14B is a schematic diagram after a pattern of a fourth conductive layer is formed.

In an exemplary embodiment, as shown in FIGS. 14A and 14B, the fourth conductive layer may include: an initial signal line INITL and a first and second electrodes T13 and T14 of a first transistor, a first and second electrodes T23 and T24 of a second transistor, a first electrode T43 of a fourth transistor, a first electrode T53 of a fifth transistor, a second electrode T64 of a sixth transistor, a first and second electrodes T73 and T74 of a seventh transistor and a first and second electrodes T83 and T84 of the eighth transistor located in at least one pixel circuit.

In an exemplary embodiment, as shown in FIGS. 14A and 14B, the first electrode T53 of the fifth transistor of the pixel circuit is the same electrode as the first electrode T53 of the fifth transistor of the first adjacent pixel circuit. The first electrode of the eighth transistor of the pixel circuit is the same electrode as the first electrode of the eighth transistor of the first adjacent pixel circuit.

In an exemplary embodiment, as shown in FIGS. 14A and 14B, the first electrode T13 of the first transistor and the initial signal line INITL are integrally formed, the second electrode T14 of the first transistor, the second electrode T24 of the second transistor and the second electrode T64 of the sixth transistor are integrally formed, forming an L-shape, the first electrode T23 of the second transistor and the first electrode T73 of the seventh transistor are integrally formed and extend along the second direction, and the second electrode T74 of the seventh transistor and the second electrode T84 of the eighth transistor are integrally formed, forming a T-shape.

In an exemplary embodiment, as shown in FIGS. 14A and 14B, an orthographic projection of the initial signal line INITL on the base substrate partially overlaps with an orthographic projection of the active layer of the first transistor and the second reset connection portion of the first reset signal line RL1 on the substrate.

In an exemplary embodiment, as shown in FIGS. 14A and 14B, the first electrode T83 of the eighth transistor is electrically connected to the active layer of the eighth transistor through the first via hole, and is electrically connected to the reference signal line REFL through the eleventh via hole, the first electrode T43 of the fourth transistor is electrically connected to the active layer of the fourth transistor through the second via hole, the second electrode T64 of the sixth transistor is electrically connected to the active layer of the sixth transistor through the third via hole, the first electrode T53 of the fifth transistor is electrically connected to the active layer of the fifth transistor through the fourth via hole, and is electrically connected to the second electrode plate C2 of the capacitor through the eighth via hole, the first electrode T13 and the second electrode T14 of the first transistor are electrically connected to the active layer of the first transistor through the sixth via hole, the first electrode T73 and the second electrode T74 of the seventh transistor are electrically connected to the active layer of the seventh transistor through the ninth via hole, the first electrode T23 and the second electrode T24 of the second transistor are electrically connected to the active layer of the second transistor through the tenth via hole, the second electrode T84 of the eighth transistor and the second electrode T74 of the seventh transistor are also electrically connected to the first electrode of the third transistor through the fifth via hole, and the first electrode T73 of the seventh transistor and the first electrode T23 of the second transistor are also electrically connected to the first electrode plate through the seventh via hole.

In an exemplary embodiment, as shown in FIGS. 14A and 14B, the orthographic projections of the integrally formed structure of the second electrode T14 of the first transistor, the second electrode T24 of the second transistor and the second electrode T64 of the sixth transistor on the base substrate partially overlaps with the orthographic projections of the active layer of the first transistor, the active layer of the second transistor, the active layer of the sixth transistor, the second scan signal line GL2 and the light emitting signal line EL on the base substrate.

In an exemplary embodiment, as shown in FIGS. 14A and 14B, an orthographic projection of the first electrode T53 of the fifth transistor on the base substrate partially overlaps with orthographic projections of the active layer of the fifth transistor, the second electrode plate of the capacitor and the light emitting signal line EL to which the pixel circuit are connected, on the base substrate.

In an exemplary embodiment, as shown in FIGS. 14A and 14B, the first electrode T53 of the fifth transistor includes an opening toward the second scan signal line GL2 connected to the pixel circuit.

In an exemplary embodiment, as shown in FIGS. 14A and 14B, an orthographic projection of the integrally formed structure of the first electrode T23 of the second transistor and the first electrode T73 of the seventh transistor on the base substrate partially overlaps with the orthographic projections of the active layer of the second transistor, the active layer of the seventh transistor, the second electrode C2 of the capacitor and the light emitting signal line EL connected to the pixel circuit on the base substrate.

In an exemplary embodiment, as shown in FIGS. 14A and 14B, the orthographic projections on the base substrate of the integrally formed structure of the second electrode T74 of the seventh transistor and the second electrode T84 of the eighth transistor partially overlaps with the orthographic projections on the base substrate of the active layer of the seventh transistor, the active layer of the eighth transistor, the first scan signal line GL1 connected to the pixel circuit, and the third scan signal line GL3 connected to the pixel circuit.

In an exemplary embodiment, an orthographic projection of the first electrode T83 of the eighth transistor on the base substrate partially overlaps with the orthographic projections on the base substrate of the active layer of the eighth transistor and the reference signal line REFL connected to the pixel circuit.

(8) Forming a pattern of a first planarization layer, which includes: on the base substrate on which the aforementioned patterns are formed, a sixth insulation thin film is deposited, the sixth insulation thin film is patterned through a patterning process to form a sixth insulation layer is formed. A first planarization thin film is coated on the sixth insulation layer, and the first planarization thin film is patterned through a patterning process to form a pattern of first planarization layer covering the aforementioned patterns, wherein the first planarization layer is provided with patterns of multiple vias, as shown in FIG. 15A and FIG. 15B, FIG. 15A is a schematic diagram of a pattern of a first planarization layer, and FIG. 15B is a schematic diagram after a pattern of a first planarization layer is formed.

Figure 15A:
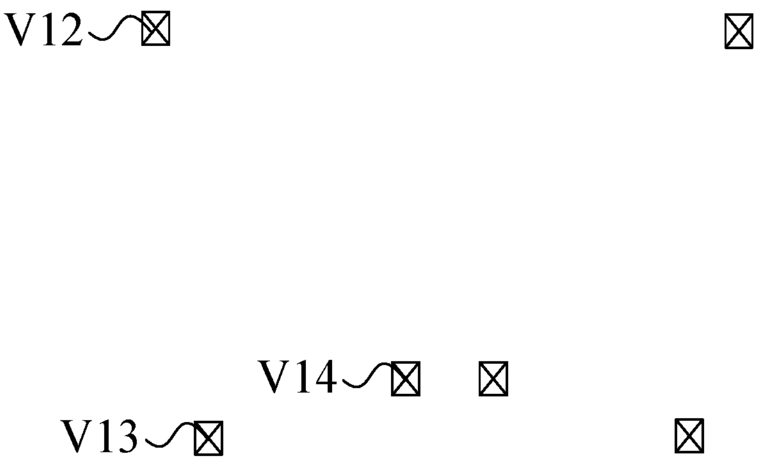
FIG. 15A is a schematic diagram of a pattern of a first planarization layer.
Figure 15B:
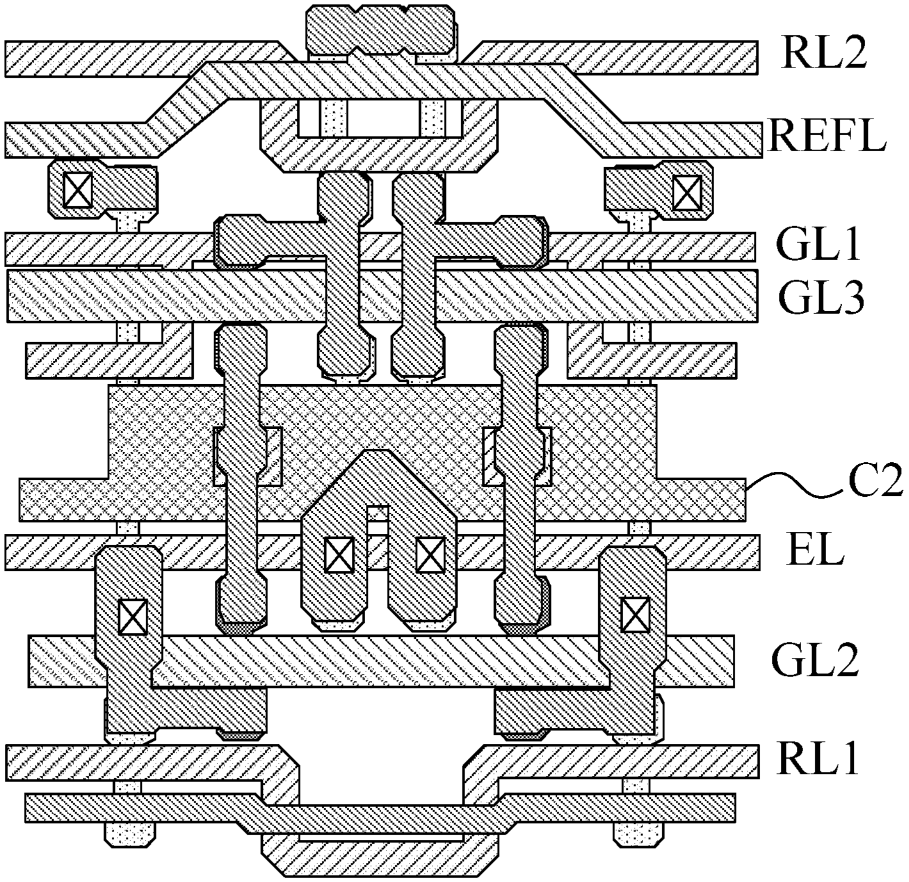
FIG. 15B is a schematic diagram after a pattern of a first planarization layer is formed.

In an exemplary embodiment, as shown in FIGS. 15A and 15B, the patterns of the multiple via holes include twelfth via hole V12 to fourteenth via hole V14 provided on the sixth insulation layer and the first planarization layer. The twelfth via hole V12 exposes the first electrode of the fourth transistor, the thirteenth via hole V13 exposes the second electrode of the sixth transistor, and the fourteenth via hole V14 exposes the first electrode of the fifth transistor.

Figure 16A:
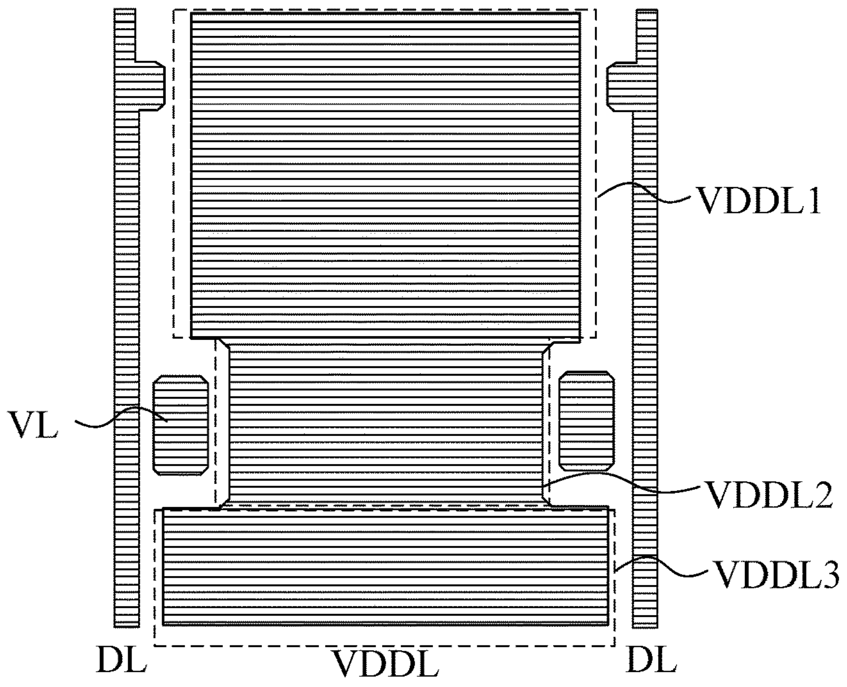
FIG. 16A is a schematic diagram of a pattern of a fifth conductive layer.
Figure 16B:
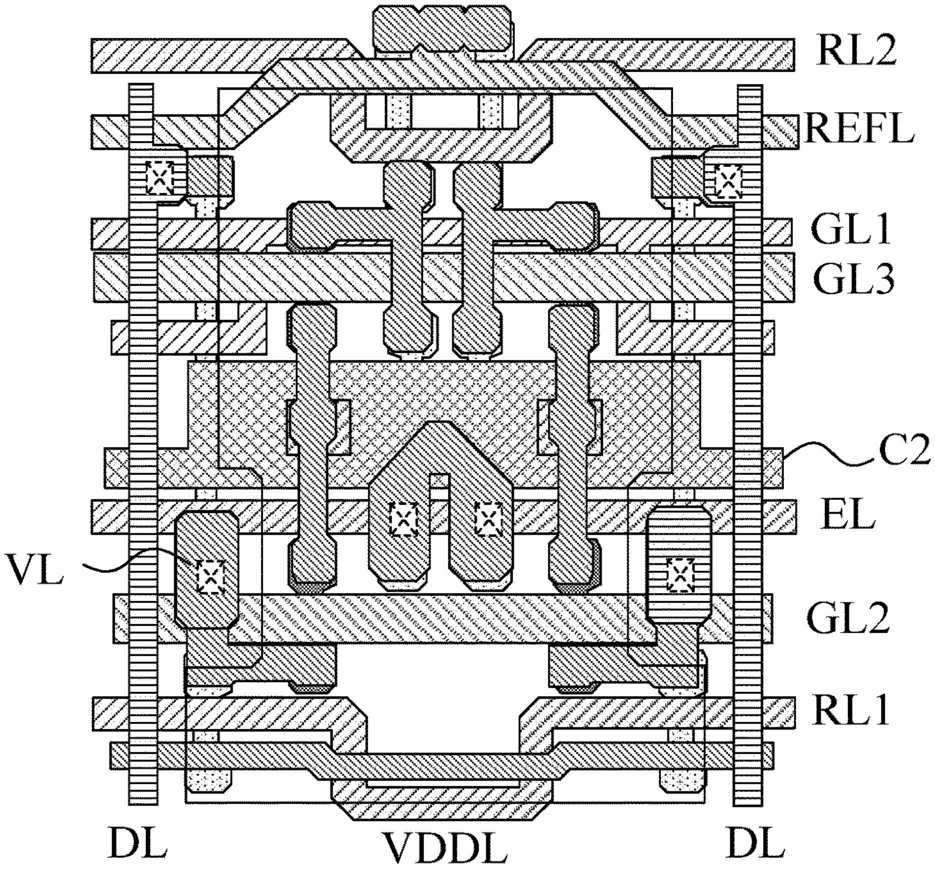
FIG. 16B is a schematic diagram after a pattern of a fifth conductive layer is formed.

(9) Forming a pattern of a fifth conductive layer, which includes: on the base substrate on which the aforementioned patterns are formed, a fifth conductive thin film is deposited, and the fifth conductive thin film is patterned through a patterning process to form a pattern of a fifth conductive layer, as shown in FIG. 16A and FIG. 16B, FIG. 16A is a schematic diagram of a pattern of a fifth conductive layer, and FIG. 16B is a schematic diagram after a pattern of a fifth conductive layer is formed.

In an exemplary embodiment, as shown in FIGS. 16A and 16B, the fifth conductive layer may include a first power supply line VDDL, a data signal line DL, and a connection electrode VL.

In an exemplary embodiment, a data signal line DL connected to the pixel circuit and a first power supply line VDDL are respectively located on both sides of the connection electrode VL.

In an exemplary embodiment, a first power supply line connected to the pixel circuit is the same power supply line as a first power supply line connected to the first adjacent pixel.

In an exemplary embodiment, a first power supply line VDDL connected to the pixel circuit may include: a first power supply portion VDDL1, a second power supply portion VDDL2 and a third power supply portion VDDL3 arranged in sequence along a second direction, wherein the second power supply portion VDDL2 is connected to the first power supply portion VDDL1 and the third power supply portion VDDL3, respectively.

In an exemplary embodiment, a length of the third power supply portion VDDL3 along a first direction is greater than a length of the first power supply portion VDDL1 along the first direction, and a length of the first power supply portion VDDL1 along the first direction is greater than a length of the second power supply portion VDDL2 along the first direction.

In an exemplary embodiment, a connection electrode VL of the pixel circuit is located on a side of the second power supply portion VDDL2 of the pixel circuit close to the data signal line DL connected to the pixel circuit.

In an exemplary embodiment, the first power supply line VDDL connected to the pixel circuit is provided with a recess on a side close to the connection electrode VL, and the connection electrode VL is located in the recess.

In an exemplary embodiment, the length of the first power supply line VDDL in the first direction is greater than the length of the data signal line DL in the first direction.

In an exemplary embodiment, the data signal line DL connected to the pixel circuit is electrically connected to the first electrode of the fourth transistor through a twelfth via hole, the connection electrode VL is electrically connected to the second electrode of the sixth transistor through a thirteenth via hole, and the first power supply line VDDL connected to the pixel circuit is electrically connected to the first electrode of the fifth transistor through a fourteenth via hole.

In an exemplary embodiment, an orthographic projection of a first power supply line VDDL on the base substrate partially overlaps with the orthographic projections of an integrated structure of a first electrode of a fifth transistor, a first electrode T13 of a first transistor, a first electrode T23 of a second transistor, and a first electrode T73 of a seventh transistor and an integrated structure of a second electrode T74 of a seventh transistor and a second electrode T84 of an eighth transistor on the base substrate.

Figure 17A:
FIG. 17A is a schematic diagram of a pattern of a second planarization layer.
Figure 17B:
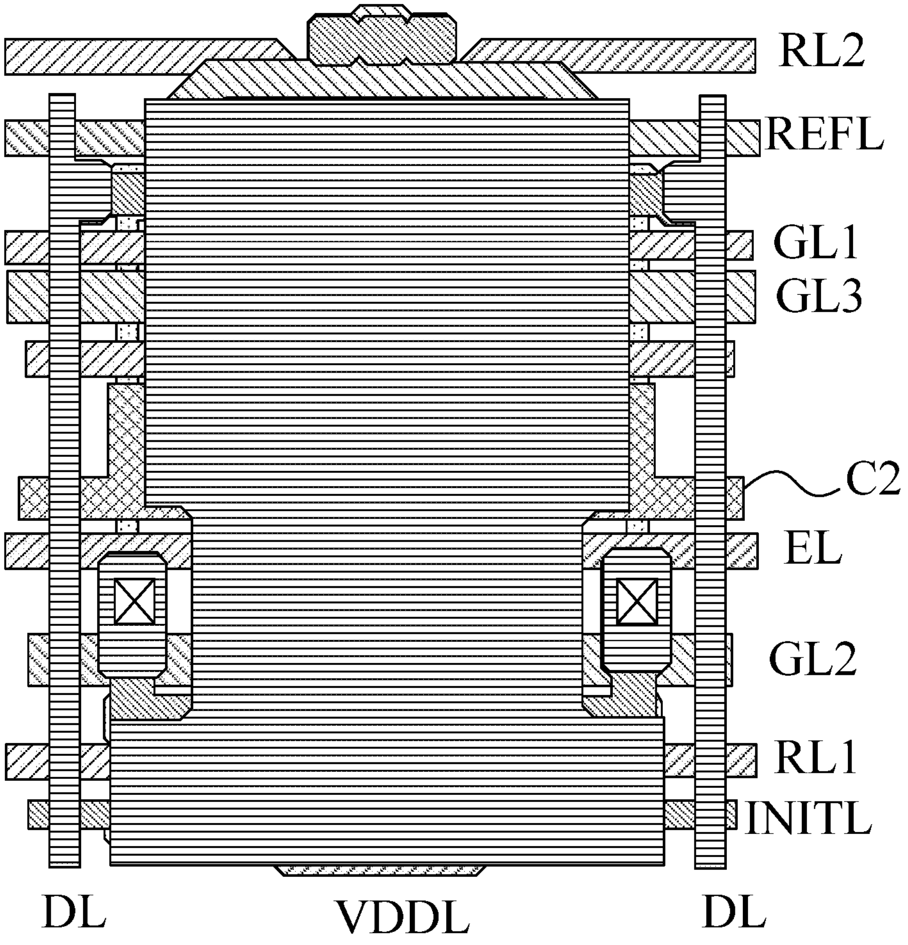
FIG. 17B is a schematic diagram after a pattern of a second planarization layer is formed.

(10) Forming a pattern of a second planarization layer, including: a second planarization thin film is coated on the base substrate on which the aforementioned patterns are formed, and the second planarization thin film is patterned to form a pattern of a second planarization layer, as shown in FIG. 17A and FIG. 17B, FIG. 17A is a schematic diagram of a pattern of a second planarization layer, and FIG. 17B is a schematic diagram after a pattern of a second planarization layer is formed.

In an exemplary embodiment, as shown in FIGS. 17A and 17B, the second planarization layer is provided with a fifteenth via hole V15. The fifteenth via hole V15 expose the connection electrode.

Figure 18A:
FIG. 18A is a schematic diagram of a pattern of an anode layer.
Figure 18B:
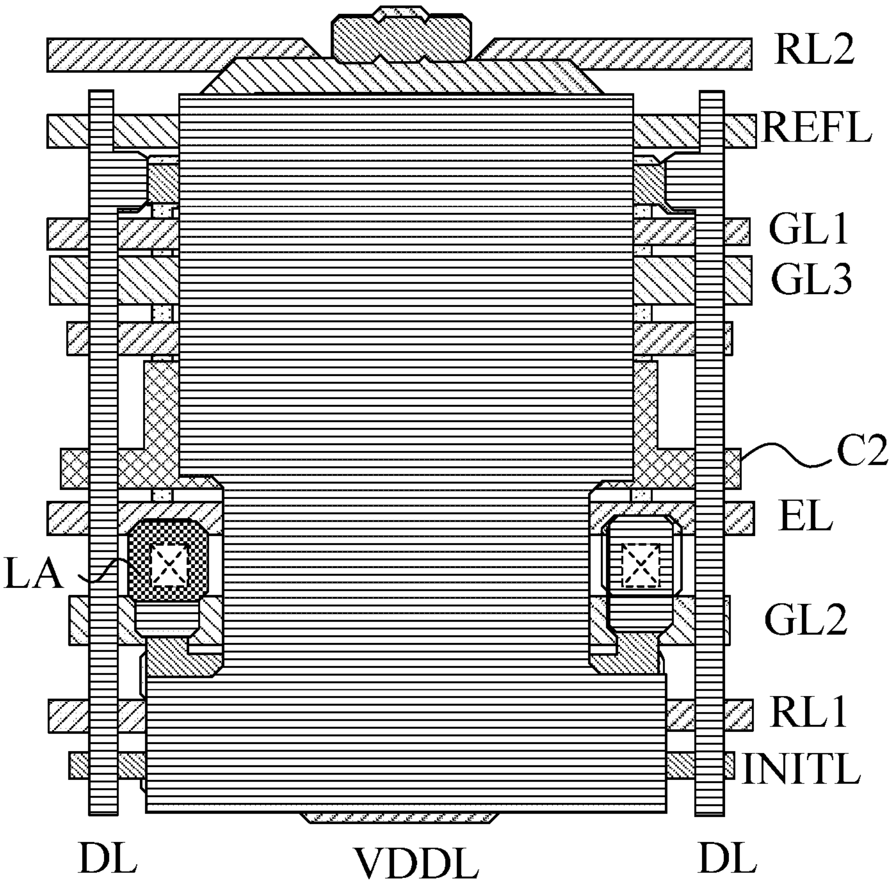
FIG. 18B is a schematic diagram after a pattern of an anode layer is formed.

(11) Forming a pattern of an anode layer, including: an anode thin film is deposited on the base substrate on which the aforementioned patterns are formed, and the anode thin film is patterned through a patterning process to form a pattern of an anode layer, as shown in FIG. 18A and FIG. 18B, FIG. 18A is a schematic diagram of a pattern of an anode layer, and FIG. 18B is a schematic diagram after a pattern of an anode layer is formed.

In an exemplary embodiment, as shown in FIGS. 18A and 18B, the anode layer may include an anode LA of the light emitting element.

(12) Forming an organic structure layer and a cathode layer, which includes: on the base substrate on which the aforementioned patterns are formed, a pixel define thin film is deposited. The pixel define thin film is patterned through a patterning process to form a pattern of a pixel define layer exposing the pattern of the anode layer. An organic light emitting material is coated on a base substrate on which the pattern of the pixel define layer is formed, the organic light emitting material is patterned through a patterning process to form a pattern of an organic structure layer. A cathode thin film is deposited on the base substrate on which the pattern of the organic material layer is formed, and the cathode thin film is patterned through a patterning process to form a cathode layer.

In an exemplary embodiment, the organic structure layer may include: an organic light emitting layer of a light emitting element.

In an exemplary embodiment, the cathode layer may include: cathodes of multiple light emitting elements.

In an exemplary embodiment, the first semiconductor layer may be an amorphous silicon layer or a polysilicon layer.

In an exemplary embodiment, the second semiconductor layer may be a metal oxide layer. The metal oxide layer may be made of an oxide containing indium and tin, an oxide containing tungsten and indium, an oxide containing tungsten and indium and zinc, an oxide containing titanium and indium, an oxide containing titanium and indium and tin, an oxide containing indium and zinc, an oxide containing silicon and indium and tin, or an oxide containing indium or gallium and zinc, etc. The metal oxide layer may be a single layer, or a double-layer, or may be a multi-layer.

In an exemplary embodiment, the first conductive layer may be made of a metal material, such as any one or more of argentum (Ag), copper (Cu), aluminum (Al), and molybdenum (Mo), or an alloy material of the above conductive material, such as an Aluminum Neodymium alloy (AlNd) or a Molybdenum Niobium alloy (MoNb), and may be of a single-layer structure or a multi-layer composite structure, such as Mo/Cu/Mo. Exemplarily, a manufacturing material of the first conductive layer may include: molybdenum.

In an exemplary embodiment, the second conductive layer may be made of a metal material, such as any one or more of argentum (Ag), copper (Cu), aluminum (Al), and molybdenum (Mo), or an alloy material of the above conductive material, such as an Aluminum Neodymium alloy (AlNd) or a Molybdenum Niobium alloy (MoNb), and may be of a single-layer structure or a multi-layer composite structure, such as Mo/Cu/Mo. Exemplarily, a manufacturing material of the second conductive layer may include: molybdenum.

In an exemplary embodiment, the third conductive layer may be made of a metal material, such as any one or more of argentum (Ag), copper (Cu), aluminum (Al), and molybdenum (Mo), or an alloy material of the above conductive material, such as an Aluminum Neodymium alloy (AlNd) or a Molybdenum Niobium alloy (MoNb), and may be of a single-layer structure or a multi-layer composite structure, such as Mo/Cu/Mo. Exemplarily, a manufacturing material of the third conductive layer may include: molybdenum.

In an exemplary embodiment, the fourth conductive layer may be made of a metal material, such as any one or more of argentum (Ag), copper (Cu), aluminum (Al), and molybdenum (Mo), or an alloy material of the above conductive material, such as an Aluminum Neodymium alloy (AlNd) or a Molybdenum Niobium alloy (MoNb), and may be of a single-layer structure or a multi-layer composite structure, such as Mo/Cu/Mo. Exemplarily, the third conductive layer may be of a three-layer stacked structure formed of titanium, aluminum, and titanium.

In an exemplary embodiment, the fifth conductive layer may be made of a metal material, such as any one or more of argentum (Ag), copper (Cu), aluminum (Al), and molybdenum (Mo), or an alloy material of the above conductive material, such as an Aluminum Neodymium alloy (AlNd) or a Molybdenum Niobium alloy (MoNb), and may be of a single-layer structure or a multi-layer composite structure, such as Mo/Cu/Mo. Exemplarily, the fourth conductive layer may be of a three-layer stacked structure formed of titanium, aluminum, and titanium.

In an exemplary embodiment, the fifth conductive layer may be made of a metal material, such as any one or more of argentum (Ag), copper (Cu), aluminum (Al), and molybdenum (Mo), or an alloy material of the above conductive material, such as an Aluminum Neodymium alloy (AlNd) or a Molybdenum Niobium alloy (MoNb), and may be of a single-layer structure or a multi-layer composite structure, such as Mo/Cu/Mo. Exemplarily, the fourth conductive layer may be of a three-layer stacked structure formed of titanium, aluminum, and titanium.

In an exemplary embodiment, the anode layer may be made of a transparent conductive material, such as any one or more of indium gallium zinc oxide (a-IGZO), zinc oxide nitride (ZnON), and indium zinc tin oxide (IZTO).

In an exemplary embodiment, the cathode layer may be made of a metal material, such as any one or more of argentum (Ag), copper (Cu), aluminum (Al), and molybdenum (Mo), or an alloy material of the above conductive material, such as an Aluminum Neodymium alloy (AlNd) or a Molybdenum Niobium alloy (MoNb), and may be of a single-layer structure or a multi-layer composite structure, such as Mo/Cu/Mo. Exemplarily, the fourth conductive layer may be of a three-layer stacked structure formed of titanium, aluminum, and titanium.

In an exemplary embodiment, the first insulation layer, the second insulation layer, the third insulation layer, the fourth insulation layer and the fifth insulation layer may be made of any one or more of silicon oxide (SiOx), silicon nitride (SiNx) and silicon oxynitride (SiON), and may be a single layer, multiple layers or a composite layer.

In an exemplary embodiment, the first planarization layer and the second planarization layer may be made of an organic material.

The display substrate according to the embodiment of the present disclosure may be applied to display products with any resolution.

An embodiment of the present disclosure further provides a method for driving the pixel circuit, wherein the drive pixel circuit is arranged, and the method for driving the pixel circuit according to the embodiment of the disclosure may include the following acts:

Act 100, a first node control sub-circuit supplies a signal of an initial signal terminal to a first node and a fourth node under the control of a first reset signal terminal and a second scan signal terminal, and a second node control sub-circuit supplies a signal of a reference signal terminal to a second node under the control of a second reset signal terminal and a first scan signal terminal.

Act 200, a first node control sub-circuit supplies a signal of a second node to a first node under the control of a third scan signal terminal, and a second node control sub-circuit supplies a signal of a data signal terminal to a third node under the control of a second reset signal terminal and a first scan signal terminal.

Act 300, a drive sub-circuit supplies a drive current to a third node under the control of a first node and a second node, and a light emitting control sub-circuit supplies a signal of a first power supply terminal to a second node and a signal of a third node to a fourth node under the control of a light emitting signal terminal.

An embodiment of the present disclosure also provides a display apparatus including a display substrate.

The display substrate is the display substrate according to any of the aforementioned embodiments, and has similar implementation principles and implementation effects, which will not be repeated here.

In an exemplary embodiment, a display apparatus may be any product or component with a display function, such as a liquid crystal panel, electronic paper, an OLED panel, an active-matrix organic light emitting diode (AMOLED for short) panel, a mobile phone, a tablet computer, a television, a display, a laptop computer, a digital photo frame, or a navigator.

The accompanying drawings of the present disclosure only involve the structures involved in the embodiments of the present disclosure, and other structures may refer to usual designs.

For the sake of clarity, in the accompanying drawings used for describing the embodiments of the present disclosure, a thickness and dimension of a layer or a micro structure is enlarged. It may be understood that when an element such as a layer, a film, a region, or a substrate is described as being "on" or "under" another element, the element may be "directly" located "on" or "under" the other element, or there may be an intermediate element.

Although the embodiments disclosed in the present disclosure are as above, the described contents are only embodiments used for convenience of understanding the present disclosure and are not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A pixel circuit disposed in a display substrate and configured to drive a light emitting element to emit light, the display substrate comprising a first driving mode and a second driving mode, wherein a refresh rate of the first driving mode is less than a refresh rate of the second driving mode, and the pixel circuit comprises a first node control sub-circuit, a second node control sub-circuit, a light emitting control sub-circuit and a drive sub-circuit;

the first node control sub-circuit is electrically connected to a first power supply terminal, a first reset signal terminal, an initial signal terminal, a second scan signal terminal, a third scan signal terminal, a first node, a second node and a fourth node respectively, and is configured to supply a signal of the initial signal terminal to the first node and the fourth node under control of the first reset signal terminal and the second scan signal terminal, and supply a signal of the second node to the first node under control of the third scan signal terminal;

the second node control sub-circuit is electrically connected to a second reset signal terminal, a reference signal terminal, a first scan signal terminal, a data signal terminal, a second node and a third node respectively, and is configured to supply a signal of the reference signal terminal to the second node and a signal of the data signal terminal to the third node under control of the second reset signal terminal and the first scan signal terminal;

the drive sub-circuit is connected to the first node, the second node, and the third node respectively, and is configured to provide a drive current to the third node under control of the first node and the second node;

the light emitting control sub-circuit is electrically connected to a light emitting signal terminal, the first power supply terminal, the second node, the third node and the fourth node, and is configured to supply a signal of the first power supply terminal to the second node and supply a signal of the third node to the fourth node under control of the light emitting signal terminal;

the light emitting element is electrically connected to the fourth node and a second power supply terminal, respectively; and a voltage value of a signal at the reference signal terminal in the first driving mode is different from a voltage value of a signal in the second driving mode.

2. The pixel circuit according to claim 1, wherein the first reset signal terminal and the second reset signal terminal are same signal terminal.

3. The pixel circuit according to claim 1, wherein the voltage value of the signal at the reference signal terminal in the first driving mode is less than the voltage value of the signal in the second driving mode;

the voltage value of the signal at the reference signal terminal is greater than or equal to a voltage value of a signal at the initial signal terminal.

4. The pixel circuit according to claim 1, wherein when the signals of the first reset signal terminal and the second reset signal terminal are valid level signals, a signal of the second scan signal terminal is a valid level signal, and signals of the first scan signal terminal, the third scan signal terminal and the light emitting signal terminal are invalid level signals;

when a signal of the first scan signal terminal is a valid level signal, a signal of the third scan signal terminal is a valid level signal, and signals of the first reset signal terminal, the second reset signal terminal, the second scan signal terminal and the light emitting signal terminal are invalid level signals;

when a signal of the light emitting signal terminal is a valid level signal, signals of the first reset signal terminal, the second reset signal terminal, the first scan signal terminal, the second scan signal terminal and the third scan signal terminal are invalid level signals.

5. The pixel circuit according to claim 1, wherein the first node control sub-circuit comprises: a reset sub-circuit, a compensation sub-circuit, and a storage sub-circuit;

the reset sub-circuit is respectively electrically connected to the first reset signal terminal, the initial signal terminal, the second scan signal terminal, the first node and the fourth node, and is configured to provide the first node and the fourth node with a signal of the initial signal terminal under control of the first reset signal terminal and the second scan signal terminal;

the compensation sub-circuit is electrically connected to the first node, the second node, and the third scan signal terminal, and is configured to provide the first node with a signal of the second node under control of the third scan signal terminal; and the storage sub-circuit is electrically connected to the first power supply terminal and the first node respectively, and is configured to store a voltage difference between a signal at the first power supply terminal and a signal at the first node.

6. The pixel circuit according to claim 5, wherein the reset sub-circuit comprises a first transistor and a second transistor, the compensation sub-circuit comprises a seventh transistor, and the storage sub-circuit comprises a capacitor comprising a first electrode plate and a second electrode plate;

a control electrode of the first transistor is electrically connected to the first reset signal terminal, a first electrode of the first transistor is electrically connected to the initial signal terminal, and a second electrode of the first transistor is electrically connected to the fourth node;

a control electrode of the second transistor is electrically connected to the second scan signal terminal, a first electrode of the second transistor is electrically connected to the first node, and a second electrode of the second transistor is electrically connected to the fourth node;

a control electrode of the seventh transistor is electrically connected to the third scan signal terminal, a first electrode of the seventh transistor is electrically connected to the first node, and a second electrode of the seventh transistor is electrically connected to the second node; and the first electrode plate of the capacitor is electrically connected to the first node, and the second electrode plate of the capacitor is electrically connected to the first power supply terminal.

7. The pixel circuit according to claim 1, wherein the second node control sub-circuit comprises: a control sub-circuit and a write sub-circuit;

the control sub-circuit is electrically connected to the second reset signal terminal, the reference signal terminal and the second node respectively, and is configured to supply a signal of the reference signal terminal to the second node under control of the second reset signal terminal; and the write sub-circuit is electrically connected to the first scan signal terminal, the data signal terminal and the third node respectively, and is configured to supply a signal of the data signal terminal to the third node under control of the first scan signal terminal.

8. The pixel circuit according to claim 7, wherein the write sub-circuit comprises: a fourth transistor, and the control sub-circuit comprises: an eighth transistor;

a control electrode of the fourth transistor is electrically connected to the first scan signal terminal, a first electrode of the fourth transistor is electrically connected to the data signal terminal, and a second electrode of the fourth transistor is electrically connected to the third node; and a control electrode of the eighth transistor is electrically connected to the third scan signal terminal, a first electrode of the eighth transistor is electrically connected to the reference signal terminal, and a second electrode of the eighth transistor is electrically connected to the second node.

9. The pixel circuit according to claim 1, wherein the first node control sub-circuit comprises: a first transistor, a second transistor, a seventh transistor, and a capacitor, the capacitor comprises: a first electrode plate and a second electrode plate; the second node control sub-circuit comprises a fourth transistor and an eighth transistor; the drive sub-circuit comprises a third transistor, and the light emitting control sub-circuit comprises a fifth transistor and a sixth transistor;

a control electrode of the first transistor is electrically connected to the first reset signal terminal, a first electrode of the first transistor is electrically connected to the initial signal terminal, and a second electrode of the first transistor is electrically connected to the fourth node;

a control electrode of the second transistor is electrically connected to the second scan signal terminal, a first electrode of the second transistor is electrically connected to the first node, and a second electrode of the second transistor is electrically connected to the fourth node;

a control electrode of the third transistor is electrically connected to the first node, a first electrode of the third transistor is electrically connected to the second node, and a second electrode of the third transistor is electrically connected to the third node;

a control electrode of the fourth transistor is electrically connected to the first scan signal terminal, a first electrode of the fourth transistor is electrically connected to the data signal terminal, and a second electrode of the fourth transistor is electrically connected to the third node; and a control electrode of the fifth transistor is electrically connected to the light emitting signal terminal, a first electrode of the fifth transistor is electrically connected to the first power supply terminal, and a second electrode of the fifth transistor is electrically connected to the second node;

a control electrode of the sixth transistor is electrically connected to the light emitting signal terminal, a first electrode of the sixth transistor is electrically connected to the third node, and a second electrode of the sixth transistor is electrically connected to the fourth node;

a control electrode of the seventh transistor is electrically connected to the third scan signal terminal, a first electrode of the seventh transistor is electrically connected to the first node, and a second electrode of the seventh transistor is electrically connected to the second node;

a control electrode of the eighth transistor is electrically connected to the third scan signal terminal, a first electrode of the eighth transistor is electrically connected to the reference signal terminal, and a second electrode of the eighth transistor is electrically connected to the second node;

the first electrode plate of the capacitor is electrically connected to the first node, and the second electrode plate of the capacitor is electrically connected to the first power supply terminal.

10. The pixel circuit according to claim 9, wherein transistor types of the first transistor, the third to sixth transistors, and the eighth transistor are opposite to transistor types of the second transistor and the seventh transistor; and the second transistor and the seventh transistor are oxide transistors.

11. A display substrate comprising: a base substrate, and a circuit structure layer and a light emitting structure layer sequentially disposed on the base substrate, the light emitting structure layer comprising a light emitting element, and the circuit structure layer comprising the pixel circuit according to claim 1 arranged in an array.

12. The display substrate of claim 11, wherein the circuit structure layer further comprises: a plurality of first reset signal lines, a plurality of second reset signal lines, a plurality of first scan signal lines, a plurality of second scan signal lines, a plurality of third scan signal lines, a plurality of light emitting signal lines, a plurality of initial signal lines, and a plurality of reference signal lines extending along a first direction and arranged along a second direction and a plurality of first power supply lines and a plurality of data signal lines extending along the second direction and arranged along the first direction, wherein the first direction intersects the second direction;

the first reset signal terminal of the pixel circuit is electrically connected to the first reset signal line, the second reset signal terminal is electrically connected to the second reset signal line, the first scan signal terminal is electrically connected to the first scan signal line, the second scan signal terminal is electrically connected to the second scan signal line, the third scan signal terminal is electrically connected to the third scan signal line, the light emitting signal terminal is electrically connected to the light emitting signal line, the initial signal terminal is electrically connected to the initial signal line, the reference signal terminal is electrically connected to the reference signal line, the first power supply terminal is electrically connected to the first power supply line, and the data signal terminal is electrically connected to the data signal line.

13. The display substrate of claim 11, wherein pixel structures of adjacent pixel circuits located in a same row are symmetrical with respect to a dummy straight line extending in a second direction;

an adjacent pixel circuit located in the same row as the pixel circuit comprises a first adjacent pixel circuit and a second adjacent pixel circuit.

14. The display substrate of claim 13, wherein the pixel circuit comprises: first to eighth transistors, and gate electrodes of the second transistor and the seventh transistor each comprise: a first gate electrode and a second gate electrode;

the second scan signal line comprises a first sub-scan signal line and a second sub-scan signal line which are arranged in different layers and connected to each other, the first gate electrode of the second transistor is arranged in the same layer as the first sub-scan signal line, and the second gate electrode of the second transistor is arranged in the same layer as the second sub-scan signal line;

the third scan signal line comprises a third sub-scan signal line and a fourth sub-scan signal line which are arranged in different layers and connected to each other, the first gate electrode of the seventh transistor is arranged in the same layer as the third sub-scan signal line, and the second gate electrode of the seventh transistor is arranged in the same layer as the fourth sub-scan signal line.

15. The display substrate according to claim 14, wherein the pixel circuit further comprises: a capacitor, and the capacitor comprises: a first electrode plate and a second electrode plate, the circuit structure layer comprises: a first semiconductor layer, a first insulation layer, a first conductive layer, a second insulation layer, a second conductive layer, a third insulation layer, a second semiconductor layer, a fourth insulation layer, a third conductive layer, a fourth conductive layer, a first planarization layer and a fifth conductive layer which are sequentially stacked on the base substrate;

the first semiconductor layer comprises: an active layer of the first transistor, an active layer of the third transistor to an active layer of the sixth transistor and an active layer of the eighth transistor in at least one pixel circuit;

the first conductive layer comprises: a first reset signal line, a second reset signal line, a first scan signal line, a light emitting signal line, and a first electrode plate, a gate electrode of a first transistor, a gate electrode of a third transistor, a gate electrode of a fourth transistor, a gate electrode of a fifth transistor, a gate electrode of a sixth transistor, and a gate electrode of an eighth transistor disposed on a capacitor of at least one pixel circuit;

the second conductive layer comprises: a first sub-scan signal line, a third sub-scan signal line, a second electrode plate of a capacitor located in at least one pixel circuit, a first gate electrode of a second transistor and a second gate electrode of a seventh transistor;

the second semiconductor layer comprises: an active layer of the second transistor and an active layer of the seventh transistor located in at least one pixel circuit;

the third conductive layer comprises: a reference signal line, a second sub-scan signal line, a fourth sub-scan signal line, and a second gate electrode of the second transistor and a second gate electrode of the seventh transistor located in at least one pixel circuit;

the fourth conductive layer comprises: an initial signal line and first and second electrodes of the first transistor, first and second electrodes of the second transistor, a first electrode of the fourth transistor, a first electrode of the fifth transistor, a second electrode of the sixth transistor, first and second electrodes of the seventh transistor and first and second electrodes of the eighth transistor located in at least one pixel circuit;

the fifth conductive layer comprises: a first power supply line, a data signal line and a connection electrode located in at least one pixel circuit, and the light emitting element is connected to the connection circuit.

16. The display substrate according to claim 15, wherein the second reset signal line and the first scan signal line connected to the pixel circuit are located on the same side of a first electrode plate of a capacitor of the pixel circuit, and the second reset signal line is located on a side of the first scan signal line away from the first electrode plate of the capacitor of the pixel circuit;

the light emitting signal line and the first reset signal line connected to the pixel circuit are located on a side of the first electrode plate of the pixel circuit away from the first scan signal line, and the first reset signal line is located on a side of the light emitting signal line away from the first electrode plate of the capacitor of the pixel circuit;

the first scan signal line comprises a scan main body portion and a scan connection portion, wherein a terminal of the scan connection portion is connected to the scan main body portion;

the scan main body portion extends along a first direction, and the scan connection portion is L-shaped.

17. The display substrate according to claim 16, wherein the first reset signal line comprises: a plurality of first reset connection portions and a plurality of second reset connection portions arranged at intervals, the second reset connection portion is arranged between two adjacent first reset connection portions and is connected to the adjacent two first reset connection portions; a second reset signal line comprises a plurality of third reset connection portions and a plurality of fourth reset connection portions arranged at intervals, wherein the fourth reset connection portion is arranged between two adjacent third reset connection portions and is connected to the adjacent third reset connection portions;

the first reset connection portion and the third reset connection portion extend in a first direction, the second reset connection portion is provided with an opening whose opening direction faces the light emitting signal line, the fourth reset connection portion is provided with an opening whose opening deviates from the first scan signal line, and a dummy straight line extending in a second direction passes through the second reset connection portion of the first reset signal line and the fourth reset connection portion of the second reset signal line;

the gate electrode of the first transistor and the first reset connection portion of the first reset signal line are integrally formed, and the gate electrode of the eighth transistor and the fourth reset connection portion of the second reset signal line are integrally formed.

18. The display substrate of claim 16, wherein second electrode plates of capacitors of adjacent pixel circuits located in the same row are connected;

the first sub-scan signal line of the second scan signal line and the third sub-scan signal line of the third scan signal line connected to the pixel circuit are respectively arranged on opposite sides of the second electrode plate of the capacitor of the pixel circuit;

the first sub-scan signal line and the first gate electrode of the second transistor are integrally formed, and the third sub-scan signal line and the first gate electrode of the seventh transistor are integrally formed;

an orthographic projection of the first sub-scan signal line on the base substrate is located between an orthographic projection of the light emitting signal line on the base substrate and an orthographic projection of the first reset signal line on the base substrate;

an orthographic projection of the third sub-scan signal line on the base substrate overlaps with an orthographic projection of the scan connection portion of the first scan signal line on the base substrate, and the orthographic projection on the base substrate is located between an orthographic projection of the scan main body portion of the first scan signal line on the base substrate and an orthographic projection of the second electrode plate of the capacitor of the connected pixel circuit on the base substrate.

19. The display substrate according to claim 14, wherein a fifth insulation layer comprises: patterns of a plurality of via holes, the patterns of the plurality of via holes comprise: a first via hole to a sixth via hole provided on the first insulation layer to the fifth insulation layer, a seventh via hole provided on the second to fifth insulation layers, an eighth via hole provided on the third to fifth insulation layers, a ninth via hole and a tenth via hole provided on the fourth and fifth insulation layers, and an eleventh via hole provided on the fifth insulation layer, wherein the eighth via hole exposes the second electrode plate of the capacitor, and the eleventh via hole exposes the reference signal line;

a dummy straight line extending in a second direction passes through the eighth via hole and the eleventh via hole;

an eighth via hole of the pixel circuit is the same via hole as an eighth via hole of the first adjacent pixel circuit, and an eleventh via hole of the pixel circuit is the same via hole as an eleventh via hole of the first adjacent pixel circuit.

20. The display substrate according to claim 14, wherein the first power supply line connected to the pixel circuit is the same power supply line as the first power supply line connected to the first adjacent pixel circuit;

the data signal line and the first power supply line connected to the pixel circuit are respectively located on two sides of a connection electrode, and a length of the first power supply line along a first direction is greater than a length of the data signal line along the first direction.

* * * * *